US012559399B2

(12) United States Patent (10) Patent No.: US 12,559,399 B2
Ogura et al. (45) Date of Patent: *Feb. 24, 2026

(54) WATER TREATMENT METHOD, WATER TREATMENT SYSTEM, CARBONIZED COMBUSTION MATERIAL, AND METHOD FOR PRODUCING CARBONIZED COMBUSTION MATERIAL

(71) Applicant: Novelgen Co., Ltd., Nagahama (JP)

(72) Inventors: Atsushi Ogura, Nagahama (JP);
Yoshihiro Kawada, Nagahama (JP);
Yui Sawada, Nagahama (JP);
Hiromasa Tabata, Nagahama (JP)

(73) Assignee: Novelgen Co., Ltd., Nagahama (JP)

( * ) Notice: Subject to any disclaimer, the term of this patent is extended or adjusted under 35 U.S.C. 154(b) by 375 days.

This patent is subject to a terminal disclaimer.

(21) Appl. No.: 18/245,117

(22) PCT Filed: Sep. 30, 2021

(86) PCT No.: PCT/JP2021/036331
§ 371 (c)(1),
(2) Date: Mar. 13, 2023

(87) PCT Pub. No.: WO2022/071545
PCT Pub. Date: Apr. 7, 2022

(65) Prior Publication Data
US 2023/0357054 A1 Nov. 9, 2023

(30) Foreign Application Priority Data
Oct. 2, 2020 (JP) ................................. 2020-168049

(51) Int. Cl.
*C02F 3/34* (2023.01)
*B01J 20/24* (2006.01)
(Continued)

(52) U.S. Cl.
CPC ................. *C02F 3/34* (2013.01); *B01J 20/24* (2013.01); *B01J 20/3274* (2013.01);
(Continued)

(58) Field of Classification Search
None
See application file for complete search history.

(56) References Cited

U.S. PATENT DOCUMENTS 11,827,551 B2 * 11/2023 Ogura ...................... C12N 1/12
2004/0168648 A1 9/2004 Ayers
(Continued)

FOREIGN PATENT DOCUMENTS

CN 110588904 12/2019
EP 4223707 A1 8/2023
(Continued)

OTHER PUBLICATIONS

Andrade et al. (MOJ Food Processing & Technology, 2018, 6, 00144). (Year: 2018).*
(Continued)

*Primary Examiner* — Clare M Perrin
(74) *Attorney, Agent, or Firm* — Muncy, Geissler, Olds & Lowe, P.C.

(57) ABSTRACT

Provided is a technique capable of efficiently removing nitrogen contained in water to be treated and efficiently recovering microplastics from the water to be treated. An aspect of the present invention is a water treatment system 10 including an aquaculture tank 20 and a water treatment tank 30. Aquatic organisms are cultivated in the aquaculture tank 20. In the water treatment tank 30, algae having a microplastic adsorption and recovery ability grow in the water to be treated introduced from the aquaculture tank 20. The microplastics contained in the water to be treated are
(Continued)

recovered, and the nitrogen compounds contained in the water to be treated are removed, by the algae.

17 Claims, 9 Drawing Sheets

(51) Int. Cl.

| | |
|---|---|
| *B01J 20/32* | (2006.01) |
| *C02F 1/28* | (2023.01) |
| *C02F 3/32* | (2023.01) |
| *C02F 101/00* | (2006.01) |
| *C02F 101/10* | (2006.01) |
| *C02F 101/16* | (2006.01) |
| *C02F 101/20* | (2006.01) |
| *C02F 101/30* | (2006.01) |
| *C02F 103/08* | (2006.01) |

(52) U.S. Cl.
CPC .............. *C02F 1/286* (2013.01); *C02F 3/322* (2013.01); *B01J 2220/4843* (2013.01); *C02F 2101/006* (2013.01); *C02F 2101/105* (2013.01); *C02F 2101/16* (2013.01); *C02F 2101/166* (2013.01); *C02F 2101/20* (2013.01); *C02F 2101/30* (2013.01); *C02F 2103/08* (2013.01); *C02F 2303/18* (2013.01); *Y02W 30/62* (2015.05)

(56) References Cited

U.S. PATENT DOCUMENTS

| | | | | |
|---|---|---|---|---|
| 2011/0308355 | A1 | 12/2011 | Kato et al. | |
| 2015/0040467 | A1 | 2/2015 | Kanehara et al. | |
| 2020/0270566 | A1 | 8/2020 | Hasunuma | |
| 2023/0192520 | A1* | 6/2023 | Allen | C12N 1/12 |
| | | | | 210/602 |

FOREIGN PATENT DOCUMENTS

| | | | |
|---|---|---|---|
| JP | 64-015133 | A | 1/1989 |
| JP | 2001-017994 | A | 1/2001 |
| JP | 2005281397 | A * | 10/2005 |
| JP | 2008-272721 | A | 11/2008 |
| JP | 2010-22331 | A | 2/2010 |
| JP | 2011-130685 | A | 7/2011 |
| JP | 2012-024752 | A | 2/2012 |
| JP | 2013-226063 | A | 11/2013 |
| JP | 2014-60967 | | 4/2014 |
| JP | 2015-061513 | A | 4/2015 |
| JP | 2015-107112 | A | 6/2015 |
| JP | 2015-216873 | A | 12/2015 |
| JP | 2016-49514 | | 4/2016 |
| JP | 2018-155437 | A | 10/2018 |
| JP | 2019-20343 | A | 2/2019 |
| JP | 2020-137514 | A | 9/2020 |
| JP | 6955292 | B1 | 10/2021 |
| JP | 2022-60173 | A | 4/2022 |
| WO | 2014/046205 | | 3/2014 |

OTHER PUBLICATIONS

Provisional Specification of Allen: Application # 63026265. (Year: 2020).*
Machine translation of JP-2005281397-A (pp. 1-5). (Year: 2005).*

Office Action of the corresponding JP application No. 2021-161747 mailed Feb. 6, 2024 and English translation thereof.
Atsushi Ogura, Technique for Removing Microplastics Using Microalgae, Convertech, Jul. 15, 2020, vol. 48, 7, 568, pp. 2-5.
Gunter Pauli, et al. Plastic "Revolution" 1st Edition, Jun. 1, 2020, pp. 116-157.
Office Action of the corresponding JP application 2021-161748 mailed Apr. 25, 2023 and English translation thereof.
Office Action of the corresponding JP application 2022-554121 mailed Apr. 25, 2023 and English translation thereof.
International Preliminary report on Patentability of the corresponding International application No. PCT/JP2021/036331 Issued Mar. 28, 2023, which includes English translation of Written Opinion of the International Searching Authority of PCT/JP2021/036331 mailed Nov. 16, 2021.
Song Chunfeng et al, "Different interaction performance between microplastics and microalgae: The bio-elimination potential of *Chlorella* sp. L38 and Phaeodactylum tricornutum MASCC-0025", Science of The Total Environment, Amsterdam, NL, (Mar. 23, 2020), vol. 723, doi: 10.1016/j.scitotenv.2020.138146, ISSN 0048-9697, pp. 1-10, XP093144098 [X] 1-4,9-12, 14-16 pp. 1,6-9 abstract [I] 5-8, 13.
Cunha César et al, "Microalgal-based biopolymer for nano- and microplastic removal: a possible biosolution for wastewater treatment", Environmental Pollution, Barking, GB, vol. 263, doi: 10.1016/J.ENVPOL.2020.114385, ISSN 0269-7491, (Mar. 16, 2020), (Mar. 16, 2020), XP086165880 [X] 1-4,9-12, 14-16 pp. 2-3,8 abstract [I] 5-8, 13.
Cunha César et al., "Marine vs freshwater microalgae exopolymers as biosolutions to microplastics pollution", Environmental Pollution, (Mar. 18, 2019), vol. 249, doi: 10.1016/J.ENVPOL.2019.03.046, ISSN 0269-7491, pp. 372-380, XP085691215 [X] 1-4,9-12, 14-16 p. 373 pp. 377-379 abstract [I] 5-8,13.
Saley A M et al, "Microplastic accumulation and biomagnification in a coastal marine reserve situated in a sparsely populated area", Marine Pollution Bulletin, Oxford, GB, vol. 146, doi: 10.1016/J.MARPOLBUL.2019.05.065, ISSN 0025-326X, (Jun. 6, 2019), pp. 54-59, (Jun. 6, 2019), XP085825095 [A] 1-16 the whole document.
Wang Xinjie et al, "A review of microplastics aggregation in aquatic environment: Influence factors, analytical methods, and environmental implications", Journal of Hazardous Materials, Elsevier, Amsterdam, NL, vol. 402, doi:10.1016/J.JHAZMAT.2020.123496, ISSN 0304-3894, (Jul. 16, 2020), (Jul. 16, 2020), XP086352291 [A] 1-16 the whole document.
The extended European search report of the corresponding EP application No. 21875841.5 mailed Apr. 4, 2024.
Atsushi Ogura: "Technology for removing microplastics using microalgae", Konbatekku = Convertech, Kako Gijutsu Kenkyukai, Tokyo, JP, vol. 48, No. 7 (568), Jul. 15, 2020 (Jul. 15, 2020), pp. 2-5 and English translation thereof.
Song Chunfeng et al: "Different interaction performance between microplastics and microalgae: The bio-elimination potential of *Chlorella* sp. L38 and Phaeodactylum tricornutum MASCC-0025", Science of the Total Environment, vol. 723, Mar. 23, 2020 (Mar. 23, 2020), pp. 1-10.
Cunha César et al: "Microalgal-based biopolymer for nano- and microplastic removal: a possible biosolution for wastewater treatment", Environmental Pollution, Barking, GB, vol. 263, Mar. 16, 2020.
Cunha César et al: "Marine vs freshwater microalgae exopolymers as biosolutions to microplastics pollution", Environmental Pollution, vol. 249, Mar. 18, 2019 (Mar. 18, 2019),—Mar. 18, 2019 (Mar. 18, 2019), pp. 372-380.
The extended European search report of the EP application No. 22834827.2 mailed Mar. 5, 2025.

* cited by examiner

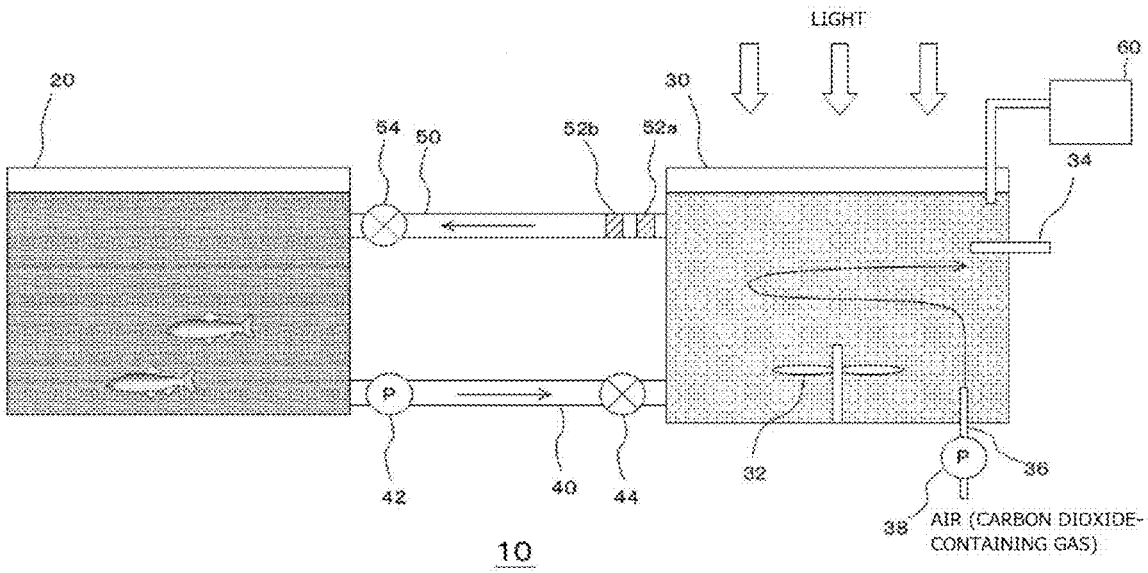

STICKY SUBSTANCE SECRETED BY MICROALGAE
MEASUREMENT METHOD

• SILICONE SHEET IS ATTACHED TO CENTER OF SLIDE GLASS TO PREPARE SLIDE GLASS FOR MEASURING STICKY SUBSTANCE (RIGHT DRAWING)

• 10 ul OF MICROALGAE CULTURE SOLUTION CULTURED ON SILICONE SHEET IS ADDED

• 10 ul OF 5-FOLD DILUTED INDIAN INK IS ADDED, INDIAN INK AND MICROALGAE CULTURE SOLUTION ARE MIXED WELL, AND AREA OF STICKY SUBSTANCE OUTSIDE CELLS OF MICROALGAE IS MEASURED UNDER MICROENVIRONMENT WITH COVER GLASS

• AS FOR CELL VOLUME, CELL VOLUME V ACCORDING TO FOLLOWING EQUATION WAS CALCULATED BY APPROXIMATING EACH ALGAE BY ELLIPTICAL CYLINDER, ELLIPTICAL SHAPE, RECTANGULAR PARALLELEPIPED, OR COMBINATION THEREOF

• ELLIPTICAL CYLINDER: $V = \pi/4 \cdot abh$  a: MAJOR AXIS OF ELLIPSE
b: MINOR AXIS OF ELLIPSE
h: HEIGHT OF ELLIPSE
ELLIPSOID: $V = \pi/6 \cdot ab2$  a: MAJOR AXIS OF ELLIPSE
b: MINOR AXIS OF ELLIPSE
RECTANGULAR
PARALLELEPIPED: $V = abh$  a: LENGTH, b: WIDTH, c: HEIGHT

SLIDE GLASS FOR MEASUREMENT

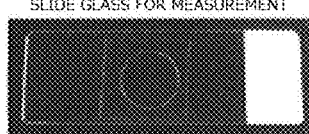

FIG. 7
Pyrocystis fusiformis
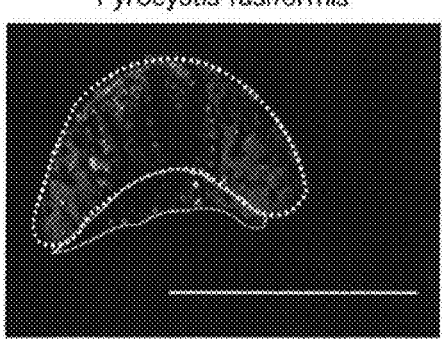
Euglena mutabilis
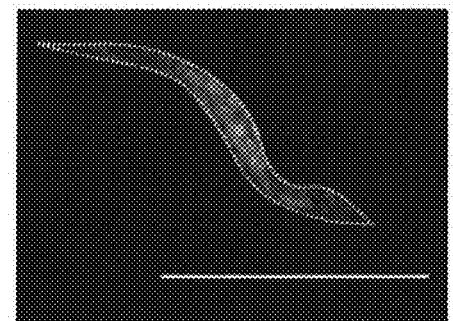
Closterium ehrenbergii
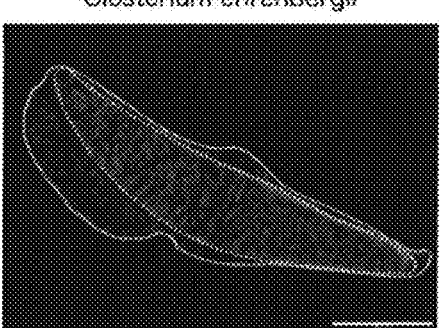
Calothrix parasitica
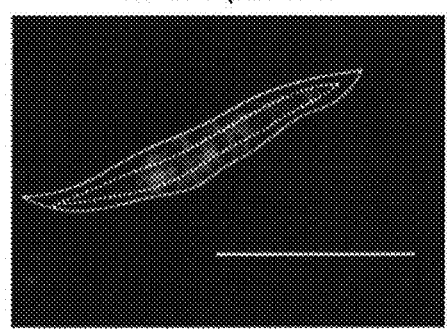
Achnanthes kuwaitensis
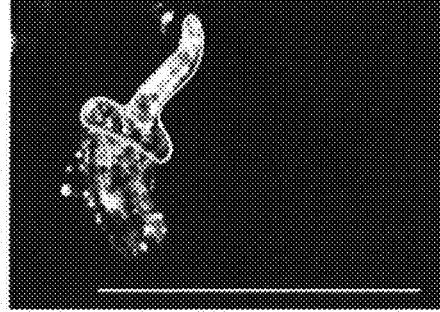
Chlorarachnion reptans
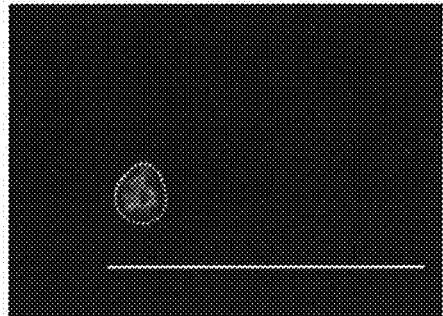
LEFT IS scale bar = 100 um   RIGHT COLUMN IS scale bar = 50 um
line = INTERFACE OF STICKY SUBSTANCE          dot line = CELL SURFACE

FIG. 11

STICKY SUBSTANCE SECRETED BY MICROALGAE
MEASUREMENT METHOD

- SILICONE SHEET IS ATTACHED TO CENTER OF SLIDE GLASS TO PREPARE SLIDE GLASS FOR MEASURING STICKY SUBSTANCE (RIGHT DRAWING)
- 10 ul OF MICROALGAE CULTURE SOLUTION CULTURED ON SILICONE SHEET IS ADDED
- 10 ul OF 5-FOLD DILUTED INDIAN INK IS ADDED, INDIAN INK AND MICROALGAE CULTURE SOLUTION ARE MIXED WELL, AND AREA OF STICKY SUBSTANCE OUTSIDE CELLS OF MICROALGAE IS MEASURED UNDER MICROENVIRONMENT WITH COVER GLASS
- AS FOR CELL VOLUME, CELL VOLUME V ACCORDING TO FOLLOWING EQUATION WAS CALCULATED BY APPROXIMATING EACH ALGAE BY ELLIPTICAL CYLINDER, ELLIPTICAL SHAPE, RECTANGULAR PARALLELEPIPED, OR COMBINATION THEREOF

- ELLIPTICAL CYLINDER: $V = \pi/4 \cdot abh$   a: MAJOR AXIS OF ELLIPSE
      b: MINOR AXIS OF ELLIPSE
      h: HEIGHT OF ELLIPSE ELLIPSOID: $V = \pi/6 \cdot ab2$   a: MAJOR AXIS OF ELLIPSE
      b: MINOR AXIS OF ELLIPSE RECTANGULAR
PARALLELEPIPED: $V = abh$   a: LENGTH, b: WIDTH, c: HEIGHT

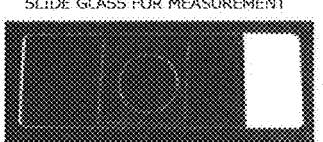

SLIDE GLASS FOR MEASUREMENT

FIG. 12

STICKY SUBSTANCE SECRETED BY MICROALGAE
MEASUREMENT METHOD

- SILICONE SHEET IS ATTACHED TO CENTER OF SLIDE GLASS TO PREPARE SLIDE GLASS FOR MEASURING STICKY SUBSTANCE (RIGHT DRAWING)
- 10 ul OF MICROALGAE CULTURE SOLUTION CULTURED ON SILICONE SHEET IS ADDED
- 10 ul OF 5-FOLD DILUTED INDIAN INK IS ADDED, INDIAN INK AND MICROALGAE CULTURE SOLUTION ARE MIXED WELL, AND AREA OF STICKY SUBSTANCE OUTSIDE CELLS OF MICROALGAE IS MEASURED UNDER MICROENVIRONMENT WITH COVER GLASS
- AS FOR CELL VOLUME, CELL VOLUME V ACCORDING TO FOLLOWING EQUATION WAS CALCULATED BY APPROXIMATING EACH ALGAE BY ELLIPTICAL CYLINDER, ELLIPTICAL SHAPE, RECTANGULAR PARALLELEPIPED, OR COMBINATION THEREOF

- ELLIPTICAL CYLINDER: $V = \pi/4 \cdot abh$   a: MAJOR AXIS OF ELLIPSE
      b: MINOR AXIS OF ELLIPSE
      h: HEIGHT OF ELLIPSE ELLIPSOID: $V = \pi/6 \cdot ab2$   a: MAJOR AXIS OF ELLIPSE
      b: MINOR AXIS OF ELLIPSE RECTANGULAR
PARALLELEPIPED: $V = abh$   a: LENGTH, b: WIDTH, c: HEIGHT

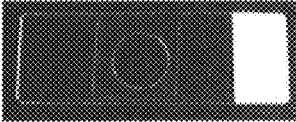

SLIDE GLASS FOR MEASUREMENT

WATER TREATMENT METHOD, WATER TREATMENT SYSTEM, CARBONIZED COMBUSTION MATERIAL, AND METHOD FOR PRODUCING CARBONIZED COMBUSTION MATERIAL

TECHNICAL FIELD

The present invention relates to a water treatment method and a water treatment system. In addition, the present invention relates to a carbonized combustion material and a method for producing a carbonized combustion material.

BACKGROUND ART

In recent years, onshore aquaculture for cultivating aquatic organisms such as fish and shellfish on land has attracted attention. In the onshore aquaculture, nitrogen compounds such as nitrite nitrogen ($NO_2$—N) and ammonia nitrogen ($NH_4^+$—N) generated by degradation of excrement, residual feed, and the like of fish and shellfish by microorganisms in water are accumulated, and when a concentration thereof is increased, the habitat of aquatic organisms is adversely affected. Therefore, in the onshore aquaculture, removal of the nitrogen compounds, in other words, denitrification is inevitable.

Conventionally, as denitrification means, denitrification means using activated sludge (see Patent Literature 1) and denitrification means using bacteria (see Patent Literature 2) are known.

On the other hand, in recent years, there has been a problem that microplastics generated by, for example, crushing of plastics affect the environment. Also as for water used for the onshore aquaculture, since it is inevitable that microplastics are mixed, a technique for recovering microplastics from aquaculture water is required.

CITATION LIST

Patent Literatures

Patent Literature 1: JP 2011-130685 A
Patent Literature 2: JP 2015-061513 A

SUMMARY OF INVENTION

Technical Problem

Conventionally known denitrification means used in onshore aquaculture does not have a function of recovering or removing microplastics, and thus an apparatus for recovering or removing microplastics is additionally required, and it is inevitable that an onshore aquaculture facility becomes complicated.

Therefore, an object of the present invention is to provide a technique capable of efficiently removing nitrogen compounds contained in water to be treated (aquaculture water) used in onshore aquaculture and efficiently recovering microplastics from the water to be treated.

Solution to Problem

An aspect of the present invention is a water treatment method. The water treatment method is a water treatment method for purifying water to be treated containing microplastics and nitrogen compounds, the water treatment method including a step of allowing algae having a microplastic adsorption and recovery ability to be present in the water to be treated, recovering the microplastics from the water to be treated containing the microplastics and the nitrogen compounds, and removing the nitrogen compounds from the water to be treated.

In the water treatment method of the aspect, the algae may be algae that secrete a sticky substance. The sticky substance may be a polysaccharide. The algae may be at least one selected from diatoms, brown algae, dinoflagellates, chlorarachniophyte algae, green algae, red algae, conjugating green algae, *euglena* algae, and blue-green algae. The water treatment method may further include a step of recovering the algae used for purification of the water to be treated; and a step of replenishing new algae. A timing of recovering the algae may be set according to a growth degree of the algae. One or more selected from the group consisting of a heavy metal, a radioactive substance, a phosphorus compound, and a potassium compound may be removed from the water to be treated. One or more selected from the group consisting of astaxanthin, β-carotene, lutein, DHA, EPA, paramylon, wax ester, hydrogen, biodiesel, bioethanol, chlostanin, and squalene may be produced.

Another aspect of the present invention is a water treatment system. The water treatment system is a water treatment system that purifies water to be treated containing microplastics and nitrogen compounds, in which when the microplastics are recovered from the water to be treated and when the nitrogen compounds are removed from the water to be treated, algae having a microplastic adsorption and recovery ability are used.

In the water treatment system of the aspect, the algae may be algae that secrete a sticky substance. The sticky substance may be a polysaccharide. The algae may be at least one selected from diatoms, brown algae, dinoflagellates, chlorarachniophyte algae, green algae, red algae, conjugating green algae, euglena algae, and blue-green algae. The water treatment system may include means for recovering the algae used for purification of the water to be treated; and means for replenishing new algae. One or more selected from the group consisting of a heavy metal, a radioactive substance, a phosphorus compound, and a potassium compound may be removed from the water to be treated. One or more selected from the group consisting of astaxanthin, β-carotene, lutein, DHA, EPA, paramylon, wax ester, hydrogen, biodiesel, bioethanol, chlostanin, and squalene may be produced.

Advantageous Effects of Invention

According to the present invention, nitrogen contained in the water to be treated can be efficiently removed, and microplastics can be efficiently recovered from the water to be treated.

BRIEF DESCRIPTION OF DRAWINGS

FIG. 4 is a view illustrating an outline of a water treatment system according to a second embodiment.

FIG. 5 is a view illustrating a procedure for measuring the amount of sticky substance secreted by algae.

FIG. 7 is an enlarged photograph of various algae used in Examples.

FIG. 11 is a view illustrating a procedure for measuring the amount of sticky substance secreted by algae.

FIG. 12 is a view illustrating a procedure for measuring the amount of sticky substance secreted by algae.

DESCRIPTION OF EMBODIMENTS

Figure 1:
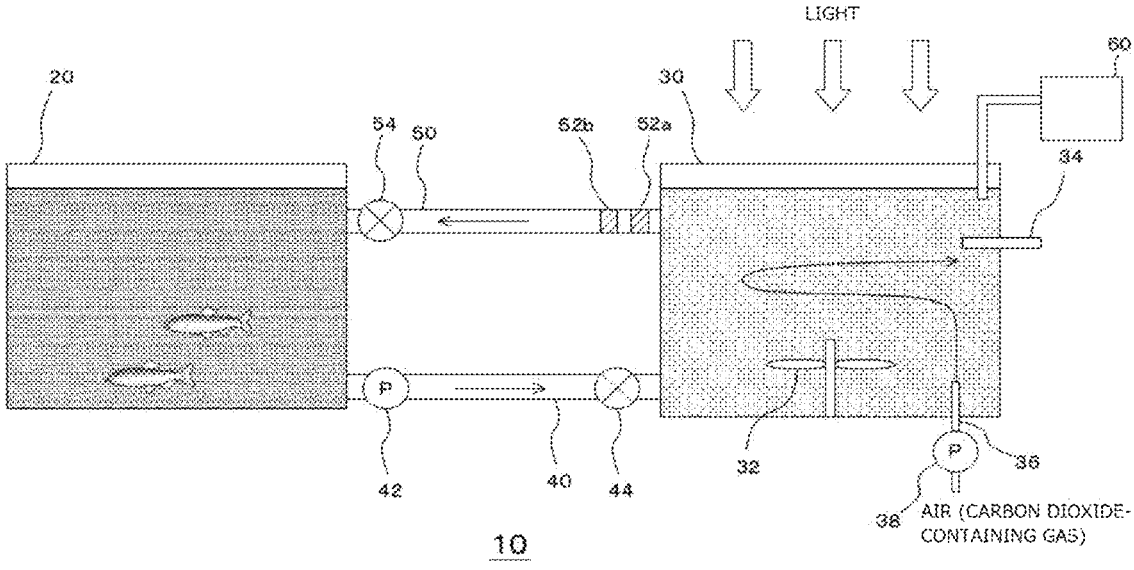
FIG. 1 is a view illustrating an outline of a water treatment system according to a first embodiment.

Hereinafter, embodiments of the present invention will be described in detail. Note that, in the present specification, the notation of "a to b" in the description of the numerical range represents a or more and b or less unless otherwise specified.

Embodiment A

Definition of Terms

<Water to Be Treated>

In the present specification, water to be treated is water in which nitrogen compounds such as nitrite nitrogen ($NO_2$—N) and ammonia nitrogen ($NH_4^+$—N) and microplastics are present or water such as sea water, fresh water, and brackish water that may be present. Specific examples of the water to be treated include sea water for aquaculture and fresh water for aquaculture.

<Microplastics>

In the present specification, the "microplastics" refer to particles of 0.1 μm or more and 5,000 μm or less (maximum length portion). However, plastics present (or possibly present) in the water to be treated as a target to be treated may include not only microplastics but also plastic particles of less than 0.1 μm and more than 5,000 μm. In addition, the majority of the microplastics (for example, 80% or more, 90% or more, or 95% or more of the total number of particles) are, for example, 0.1 μm or more, 0.5 μm or more, 1 μm or more, 2 μm or more, 3 μm or more, 4 μm or more, 5 μm or more, 6 μm or more, 7 μm or more, 10 μm or more, 50 μm or more, 100 μm or more, 500 μm or more, 1,000 μm or more, and 2,500 μm or more; and 2,500 μm or less, 1,000 μm or less, 500 μm or less, 100 μm or less, 50 μm or less, 10 μm or less, 9 μm or less, 8 μm or less, 7 μm or less, 6 μm or less, 5 μm or less, 4 μm or less, and 3 μm or less (maximum length portion). Note that, as is well known, examples of the microplastics include primary microplastics (plastics produced in micro size, for example, used for capsules of a facial cleanser, a softener, and a slow-release fertilizer) and secondary microplastics (large plastics are crushed and subdivided into micro sizes in a natural environment).

<Algae Having Microplastic Adsorption and Recovery Ability>

In the present specification, the "algae having a microplastic adsorption and recovery ability" refer to algae capable of reducing a concentration of the microplastics in the water to be treated when algae are present by a predetermined amount (for example, 10%, 20%, 30%, 40%, 50%, 60%, 70%, 80%, 90%, or 95%) or more relative to a concentration of the microplastics in the water to be treated when algae are not present. Here, examples of the algae having such properties include diatoms and brown algae belonging to stramenopiles, dinoflagellates belonging to Alveolata, chlorarachniophyte algae belonging to Rhizaria, green algae, red algae, and conjugating green algae belonging to Archaeplastida, euglena algae belonging to Excavata, and blue-green algae belonging to eubacteria that secrete a sticky substance; algae (for example, diatoms) having a physical structure (for example, a porous structure or a rough structure) that trap microplastics; and algae charged oppositely to microplastics. For example, microalgae have various shapes and sizes, but porous algae having a large surface area and algae that form filamentous colonies are present. Such a structure also has a function of trapping the microplastics.

Examples of the "algae that secrete a sticky substance" include diatoms and brown algae belonging to stramenopiles, dinoflagellates belonging to Alveolata, chlorarachniophyte algae belonging to Rhizaria, green algae, red algae, and conjugating green algae belonging to Archaeplastida, euglena algae belonging to Excavata, and blue-green algae belonging to eubacteria. Here, microalgae are known to release various sticky substances to the outside of cells. The sticky substance is typically a polysaccharide, and is, for example, a substance such as agarose or porphyran in the case of red algae such as Gelidiaceae and conjugating green algae, or alginic acid or fucose-containing polysaccharide in the case of brown algae such as kelp.

Here, the sizes of the algae are not particularly limited. However, considering that the sizes of the microplastics to be treated are 0.1 μm or more and 5,000 μm or less, it is preferable that the sizes of the microplastics are 5,000 μm or more (for example, in a case of algae that are linked or clustered, the size of the linked or clustered algae). However, the sizes of the algae may depend on the predominant sizes of the microplastics present in the water to be treated, and in this case, the assumed sizes of algae are, for example, 0.1 μm or more, 1 μm or more, 2 μm or more, 5 μm or more, 10 μm or more, 50 μm or more, 100 μm or more, 500 μm or more, 1,000 μm or more, and 2,500 μm or more, and 5,000 μm or less, 2,500 μm or less, 1,000 μm or less, 500 μm or less, 250 μm or less, 100 μm or less, 50 μm or less, 25 μm or less, 20 μm or less, 10 μm or less, 5 μm or less, and 1 μm or less. Note that the "size" used herein refers to a maximum diameter portion (for example, in a case of rod-shaped algae, a long diameter portion). In addition, algae having various sizes are present in the system, and the term "size" used herein refers to an average value of sizes of 100 algae randomly acquired.

The amount of the sticky substance secreted by the algae is preferably 0.25 times or more the volume of the sticky substance secreted extracellularly as compared with the cell size. Note that a method for measuring a volume of the sticky substance is as follows. 10 μL of a microalgae culture solution is added onto a glass slide. Furthermore, 10 μL of 5-fold diluted Indian ink is added, the Indian ink and the microalgae culture solution are mixed well, a volume of cells of the microalgae and a volume of a sticky substance outside the cells are measured under microscopic conditions with a cover glass. According to the method by Kishimoto et al. {Kishimoto N., Ichise S., Suzuki K., Yamamoto C.: Analysis of long-term variation in phytoplankton biovolume in the northern basin of Lake Biwa. Limnology 14: 117-128 (2013)}, the cell volume is calculated by approximating each algae by an elliptical cylinder, an elliptical shape, a rectangular parallelepiped, or a combination thereof. With respect to the volume of the sticky substance outside of the cells, a volume including a portion not dyed with the Indian ink is calculated, and a volume of the sticky substance outside the cells is obtained by dividing the cell volume. FIG. 5 is a view illustrating the above procedure. In addition, algae having various sizes are present in the system, and the term "amount" used herein refers to an average value of sizes of 100 algae randomly acquired.

(Water Treatment System)

FIG. 1 is a view illustrating an outline of a water treatment system 10 according to a first embodiment. As illustrated in FIG. 1, the water treatment system 10 is an example of an aquaculture system including an aquaculture tank 20 and a water treatment tank 30.

Aquatic organisms cultivated using the aquaculture tank 20 are not particularly limited, and for example, fresh water organisms such as rainbow trout, char, cherry salmon, eel, and sturgeon may be cultivated using fresh water, and sea water organisms such as flatfish, tiger puffer, whiteleg shrimp, abalone, and salmon may be cultivated using sea water.

The aquaculture tank 20 and the water treatment tank 30 are connected by an introduction pipe 40 and a discharge pipe 50.

Water to be treated (fresh water or sea water) containing microplastics and nitrogen compounds in the aquaculture tank 20 flows into the water treatment tank 30 through the introduction pipe 40. The introduction pipe 40 is provided with a flow rate control pump 42. A flow rate of the water to be treated flowing through the introduction pipe 40 is controlled by the flow rate control pump 42. In the present embodiment, water constantly circulates between the aquaculture tank 20 and the water treatment tank 30 while the flow rate control pump 42 is operated.

Note that a suction port of the introduction pipe 40 connected to the aquaculture tank 20 is installed at a lower portion of the aquaculture tank 20, such that the nitrogen compounds precipitated at the lower portion of the aquaculture tank 20 can be efficiently introduced into the water treatment tank 30.

In the water treatment tank 30, algae having a microplastic adsorption and recovery ability grow in the water to be treated introduced from the aquaculture tank 20. The microplastics contained in the water to be treated are recovered, and the nitrogen compounds contained in the water to be treated are removed, by the algae.

Specifically, the microplastics contained in the water to be treated are adsorbed on an adsorptive substance secreted by the algae. The microplastics are removed from the water to be treated by removing the algae on which the microplastics are adsorbed using removing means such as a filter.

In addition, the nitrogen compounds such as ammonia nitrogen and nitrite nitrogen are accumulated in cells of the algae as the algae grow. Therefore, a concentration of the nitrogen compounds in the water to be treated in the water treatment tank 30 can be reduced. By removing the accumulated algae, the nitrogen compounds (ammonia nitrogen and nitrite nitrogen) are removed from the water to be treated.

The water treatment tank 30 is configured to be able to appropriately add the algae stored in an algae reserve tank 60. The algae stored in the algae reserve tank 60 are algae before being used for recovering the microplastics and removing the nitrogen compounds, and are preferably algae immediately after germination or at an early stage of growth.

As described below, the water treatment tank 30 is provided with various mechanisms for securing an environment required for growth of algae.

<Mechanism for Irradiating Algae with Light>

The algae in the water treatment tank 30 are irradiated with light. The light radiated to the algae in the water treatment tank 30 is not limited to sun light, and may be artificial lighting such as an LED, a fluorescent lamp, or an incandescent lamp including light having a wavelength suitable for growth of the algae.

In the case of using artificial lighting, light may be constantly radiated (for 24 hours), but the irradiation time per day may be appropriately set (for example, for 10 to 12 hours) in accordance with growth and rest of the algae. By adjusting the irradiation time of the artificial lighting, the growth of the algae can be further promoted depending on the type of algae.

In addition, an installation place of the artificial lighting is not limited to above the water treatment tank 30, and may be the inside of the water treatment tank 30. By installing the artificial lighting inside the water treatment tank 30, more algae in the water treatment tank 30 can be irradiated with light as compared with a case where the artificial lighting is installed outside the water treatment tank 30. As a result, the growth of the algae is further promoted in the water treatment tank 30, and recovery of the microplastics and removal of the nitrogen compounds can be more efficiently performed.

<Mechanism for Stirring Water to be Treated in Water Treatment Tank>

A stirring mechanism 32 is provided in the water treatment tank 30. The stirring mechanism 32 is operated, such that the algae and the water to be treated in the water treatment tank 30 are stirred, and the algae are dispersed in the entire water to be treated in the water treatment tank 30.

Specific examples of the stirring by the stirring mechanism 32 include stirring algae and water to be treated with a water flow generated by a pump, a propeller, a stirrer (for example, a magnetic stirrer), or the like, stirring algae and water to be treated with gas such as air or carbon dioxide, and stirring algae and water to be treated using a shaker that shakes the entire water treatment tank 30.

<Mechanism for Supplying Carbon Dioxide to Water to be Treated in Water Treatment Tank>

A gas introduction pipe 36 for supplying carbon dioxide to the water to be treated in the tank is installed in the water treatment tank 30. A gas flow rate regulation pump 38 is installed in the gas introduction pipe 36. Carbon dioxide or gas containing carbon dioxide (for example, air) is supplied to the water to be treated stored in the water treatment tank 30 by the gas flow rate regulation pump 38.

A discharge port of the gas introduction pipe 36 is preferably installed at a lower portion of the water treatment tank 30. According to this, with bubbling with carbon dioxide discharged from the gas introduction pipe 36, it is possible to achieve an effect of stirring the algae and the water to be treated while increasing a concentration of carbon dioxide in the water to be treated without providing a mechanism dedicated to stirring.

The supply of carbon dioxide to the water to be treated may be continuously performed, but as illustrated in FIG. 1, a gas sensor 34 capable of measuring the concentration of the carbon dioxide in the water to be treated in the water treatment tank is provided, and a flow rate of gas discharged from the gas introduction pipe 36 may be regulated using the gas flow rate regulation pump 38 according to the concentration of the carbon dioxide measured by the gas sensor 34.

Next, suitable recovery conditions in a method for recovering the microplastics and the nitrogen compounds from the water to be treated containing the microplastics and the nitrogen compounds in the water treatment tank 30 will be described.

A suitable concentration of the algae in the water treatment tank 30 varies depending on the concentration of the microplastics and the sizes of the microplastics in the water to be treated, the concentration of the nitrogen compounds in the water to be treated, the type of algae used, and the like. This condition setting can be determined, for example, by conducting a model experiment described in Examples.

A suitable recovery time in the water treatment tank 30 varies depending on the concentration of the microplastics and the sizes of the microplastics in the water to be treated, the concentration of the nitrogen compounds in the water to be treated, the type of algae used, the concentration of the microplastics and the concentration of the nitrogen compounds targeted for reduction, and the like. This condition setting can be determined, for example, by conducting a model experiment described in Examples.

The treated water from which the microplastics are recovered and the nitrogen compounds are removed in the water treatment tank 30 flows into the aquaculture tank through the discharge pipe 50. The discharge pipe 50 is provided with a first filter 52a and a second filter 52b.

The first filter 52a has a function of removing algae to which microplastics are attached from the water to be treated. An aperture or pore size of the first filter 52a is not particularly limited as long as the algae to which the microplastics are attached can be removed, and is, for example, 5 μm.

Figure 2:
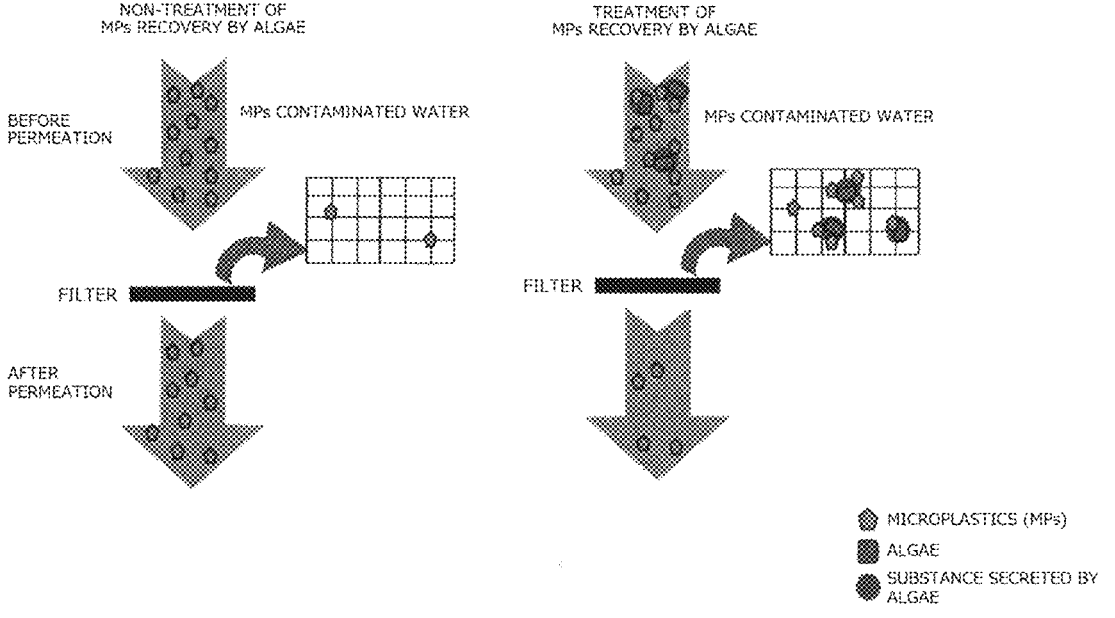
FIG. 2 is a conceptual view illustrating a state in which algae to which microplastics are attached are removed by a first filter.

FIG. 2 is a conceptual view illustrating a state in which the algae to which the microplastics are attached are removed by the first filter 52a. As illustrated in FIG. 2, algae to which microplastics are attached and algae to which microplastics are not attached are sorted by a substance secreted by the algae using the first filter 52a with an adjusted aperture or pore size. By allowing the water to be treated to pass through the first filter 52a, primary treated water from which the microplastics are removed is obtained.

The second filter 52b has a function of removing algae that have passed through the first filter 52a. An aperture or hole size of the second filter 52b is, for example, 5 μm although it depends on the type of algae used. The algae in which the nitrogen compounds are accumulated that are contained in the primary treated water are sorted by the second filter 52b. In other words, by allowing the primary treated water to pass through the second filter 52b, secondary treated water from which the algae in which the nitrogen compounds are accumulated are removed is obtained.

Examples of the filter used as the first filter 52a and the second filter 52b include a chemical fiber filter, a natural fiber filter, a metal filter such as a metal mesh, and a filter in a thread-like or paper-like form.

<Stirring Control>

The stirring of the algae and the water to be treated in the water treatment tank by the stirring mechanism 32 may be continuously performed without being stopped in the process of growing the algae, but as described below, the stirring may be intermittently performed in accordance with the growth or state of the algae.

<<Stirring Control Method 1>>

A flow rate sensor (not illustrated) that measures a flow rate of the water to be treated introduced from the introduction pipe 40 is provided, and a stirring speed of the stirring mechanism 32 is changed according to the flow rate measured by the flow rate sensor. In this case, the stirring speed may be proportional to the flow rate. In addition, the stirring speed may be set stepwise according to the flow rate.

<<Stirring Control Method 2>>

A camera (not illustrated) is used to monitor a degree of dispersion of the algae in the water treatment tank 30. Based on the obtained image, it is determined whether or not algae are precipitated on the bottom of the water treatment tank 30, and in a case where it is determined that algae are precipitated on the bottom of the water treatment tank 30, the stirring speed is increased.

<Recovery and Replenishment of Algae>

Examples of a timing of recovering and replenishing the algae used for purification include a case where a timing is set according to a growth degree of the algae and a case where a timing is set according to an ability of the filter.

<<Algae Recovery Timing 1>>

A state of the algae in the water treatment tank 30 is imaged by a camera (not illustrated). The camera may be installed above the water treatment tank 30 to image the algae in the water to be treated in the water treatment tank 30. In addition, the camera may be installed inside the water to be treated in the water treatment tank 30 to image the algae in the water to be treated in the water treatment tank 30 underwater.

A ratio of an area occupied by the algae per unit area in the captured image is calculated. In a case where the ratio occupied by the algae is equal to or more than a reference value, it is determined that the algae are sufficiently grown, and the first filter 52a and the second filter 52b are replaced. According to this, algae having a reduced ability to recover the microplastics and remove the nitrogen compounds can be removed from the water treatment tank 30.

In addition, imaging by the camera may be performed at a predetermined interval, a growth curve of the algae may be drawn from the ratio of the area occupied by the algae per unit area in the captured image, and it may be determined that the algae are sufficiently grown at a time point when the cell growth reaches the end stage (for example, a time point when a growth log curve reaches a plateau) to replace the first filter 52a and the second filter 52b. According to this, algae having a reduced ability to recover the microplastics and remove the nitrogen compounds can be removed from the water treatment tank 30.

<<Algae Recovery Timing 2>>

A turbidity of the water to be treated in the water treatment tank 30 may be measured as an index indicating a density of the algae using an absorptiometer (not illustrated). In a case where the measured turbidity is equal to or more than a reference value, it is determined that the algae are sufficiently grown, and the first filter 52a and the second filter 52b are replaced. According to this, algae having a reduced ability to recover the microplastics and remove the nitrogen compounds can be removed from the water treatment tank 30.

<<Algae Recovery Timing 3>>

In a case where a fatty acid (oil) is produced as the algae grow, a concentration of the fatty acid in the water to be treated in the water treatment tank 30 may be measured. In a case where the measured concentration is equal to or more than a reference value, it is determined that the algae are sufficiently grown, and the first filter 52*a* and the second filter 52*b* are replaced. According to this, algae having a reduced ability to recover the microplastics and remove the nitrogen compounds can be removed from the water treatment tank 30.

<<Algae Recovery Timing 4>>

In a case where a color of the algae is changed as the algae grow, a growth degree can be determined according to the color of the algae. Specifically, similarly to the above, a state of the algae in the water treatment tank 30 is imaged by the camera, it is determined whether the color of the imaged algae is changed from a color during growth (growth phase) (for example, green) to a color at the end of growth (for example, brown), and when it is determined that the color is at the end of growth, the first filter 52*a* and the second filter 52*b* are replaced. According to this, algae having a reduced ability to recover the microplastics and remove the nitrogen compounds can be removed from the water treatment tank 30.

<<Algae Recovery Timing 5>>

The algae may be recovered by replacing the first filter 52*a* and the second filter 52*b* when a rate of the water flow flowing through the introduction pipe 40 or the discharge pipe 50 is less than a predetermined value. According to this, it is possible to recover the microplastics and remove the nitrogen compounds while maintaining the filtering efficiency of the first filter 52*a* and the second filter 52*b* at a certain level or more.

<Algae Replenishment>

At a predetermined timing, after the algae grown to a certain level are removed, it is preferable to replenish the algae immediately after germination corresponding to the number of removed algae or at the initial stage of growth from the algae reserve tank 60. According to this, in a case where the efficiency of the recovery of the microplastics and the removal of the nitrogen compounds is gradually reduced in accordance with the growth of the algae, the efficiency can be restored.

Figure 3:
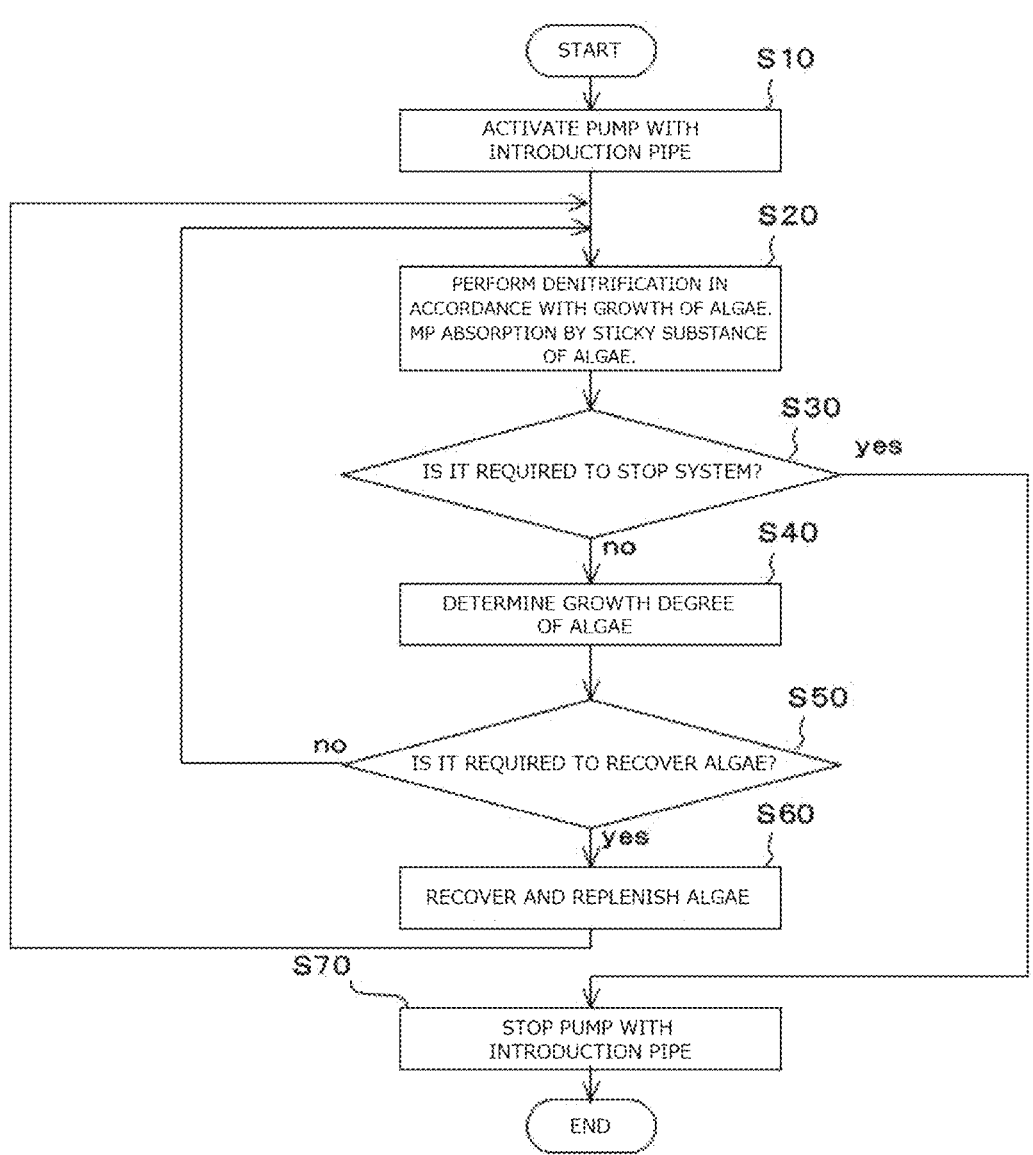
FIG. 3 is a flowchart illustrating a treatment related to recovery and replenishment of algae.

FIG. 3 is a flowchart illustrating a treatment related to recovery and replenishment of algae. As illustrated in FIG. 3, first, the flow rate control pump 42 installed in the introduction pipe 40 is activated, and the water to be treated is introduced into the water treatment tank 30 from the aquaculture tank 20 (S10). In the water treatment tank 30 into which the water to be treated is introduced, denitrification and recovery of the microplastics by the sticky substance secreted by the algae in accordance with the growth of the algae are performed (S20). Subsequently, it is determined whether or not it is required to stop the system when a predetermined time has elapsed after the start of activation (S30). When it is required to stop the system (yes in S30), the flow rate control pump 42 provided in the introduction pipe 40 is stopped. On the other hand, when the operation of the system is continued (no in S30), a growth degree of the algae is determined based on the image captured by the camera. As described above, the determination of the growth degree of the algae may be performed based on the ratio of the area occupied by the algae per unit area in the captured image, or may be performed based on the color of the captured algae. When it is determined that it is required to recover the algae based on the determined growth degree of the algae (yes in S50), the algae are recovered by replacing the filter 52*a*, and then new algae corresponding to the recovered algae are replenished to the water treatment tank 30 (S60), and the process returns to S20. On the other hand, when it is determined that it is not required to recover the algae (no in S50), and the process returns to S20.

<<Algae Composition>>

The algae used in the present embodiment may be an algae composition. Specifically, the algae are a group of the same or different kinds of algae. Here, the algae group is preferably housed in a container or the like, for example, in a state where the algae can survive (for example, in a liquid medium). In addition, algae that can survive freeze-drying may be handled in a dry form. Note that the algae composition may contain components other than algae, if necessary.

<Temperature Management>

In the present embodiment, since water circulates between the aquaculture tank 20 and the water treatment tank 30, a water temperature in the water treatment tank 30 is equal to a water temperature in the aquaculture tank 20. In this case, the algae to be cultured in the water treatment tank 30 may be selected from algae for which a suitable water temperature in the aquaculture tank 20 is within a water temperature range. When the water temperature is in a low temperature region of 0 to 20° C., for example, blue-green algae having low temperature resistance, for example, the genus *Chroococcus*, the genus *Oscillatoria*, and the genus *Nostocales*, or green algae having low temperature resistance, for example, the genus *Chlamydomonas* and the genus *Chloromonas* can be used. In addition, when the water temperature is in a medium or high temperature region of 20 to 30° C., for example, general algae such as diatoms, blue-green algae, conjugating green algae, euglena, and brown algae can be used.

When the water temperature in the aquaculture tank 20 is different from an appropriate growth temperature of the algae cultured in the water treatment tank 30, the temperature of the water to be treated flowing into the water treatment tank 30 from the aquaculture tank 20 may be adjusted, and the temperature of the water to be treated flowing into the aquaculture tank 20 from the water treatment tank 30 may be adjusted.

Specifically, a temperature sensor that measures the water temperature in the aquaculture tank 20 is provided, and the temperature of the water to be treated is heated or cooled to a desired water temperature suitable for the growth of the algae based on the temperature measured by the temperature sensor. On the other hand, a temperature sensor that measures the water temperature in the water treatment tank 30 is provided, and the temperature of the treated water flowing into the aquaculture tank 20 from the water treatment tank 30 is heated or cooled so that the temperature of the treated water becomes the water temperature of the aquaculture tank 20 based on the temperature measured by the temperature sensor.

Examples of means for heating include heat exchange with surplus exhaust heat of sun light, geothermal heat, a garbage incineration plant, or the like, and heating by a heater. On the other hand, examples of means for cooling include heat exchange with environmental water such as rivers without energy and power consumption and cooling using energy and power (for example, heat exchange with a refrigerant).

<Adjustment of Nutrition, pH, and the Like>

Additive components contributing to the growth of the algae such as minerals or vitamins such as nutrient salts such as phosphorus, nitrogen, potassium, and sodium silicate may be appropriately added to the water to be treated in the water treatment tank 30. Examples of a timing of adding each of the additive components include a time point when a concentration of each of the additive components is measured and the concentration becomes less than a predetermined value. By appropriately adding the additive components to the water to be treated, the growth of the algae in the water treatment tank can be further promoted, and furthermore, the recovery efficiency of the microplastics and the removal efficiency of the nitrogen compounds can be improved.

In addition, an acid (for example, acetic acid) or alkali (for example, sodium hydroxide) for adjusting a pH may be appropriately added to the water to be treated in the water treatment tank 30. Specifically, the pH of the water to be treated is measured, and an appropriate amount of acid or alkali may be added so that the measured pH value is within a predetermined range, for example, 5 to 9. As a result, the growth of the algae is further promoted in the water treatment tank 30, and recovery of the microplastics and removal of the nitrogen compounds can be more efficiently performed.

FIG. 4 is a view illustrating an outline of a water treatment system 10 according to a second embodiment. Regarding the water treatment system 10 of the present embodiment, the same components as those of the water treatment system 10 of the first embodiment are denoted by the same reference numerals, and description thereof will be appropriately omitted.

In the water treatment system 10 of the present embodiment, a first opening and closing valve 44 and a second opening and closing valve 54 are installed in a path of an introduction pipe 40 and a path of a discharge pipe 50, respectively. The first opening and closing valve 44 and the second opening and closing valve 54 may be manual valves or electric valves such as electromagnetic valves.

In the present embodiment, the first opening and closing valve 44 and the second opening and closing valve 54 are opened and closed at a predetermined timing. For example, cultivation is performed in the aquaculture tank 20 for a certain period in a state where the first opening and closing valve 44 and the second opening and closing valve 54 are closed. Next, at a timing when a concentration of the nitrogen compounds in the aquaculture tank 20 is increased, the first opening and closing valve 44 and the second opening and closing valve 54 are opened, and the flow rate control pump 42 is operated to start the water circulation between the aquaculture tank 20 and the water treatment tank 30.

At a timing when exchange between the water in the aquaculture tank 20 and the water in the water treatment tank 30 is completed, the first opening and closing valve 44 and the second opening and closing valve 54 are closed, and the operation of the flow rate control pump 42 is stopped. In this state, the algae are grown in the water treatment tank 30 until a predetermined period has elapsed, such that recovery of the microplastics from the water to be treated and accumulation of the nitrogen compounds in the water treatment tank 30 are performed by the algae. After a predetermined period has elapsed, the first opening and closing valve 44 and the second opening and closing valve 54 are opened, and the flow rate control pump 42 is operated, such that the treated water in which the concentrations of the microplastics and the nitrogen compounds are reduced can be supplied to the aquaculture tank 20.

(Another Aspect of Water Treatment System)

Another aspect of the water treatment system includes a water treatment tank into which water to be treated containing microplastics and nitrogen compounds is introduced. The water to be treated stored in the water treatment tank is configured to be irradiated with light. In the water treatment tank, algae having a microplastic adsorption and recovery ability are used to recover the microplastics contained in the water to be treated, and due to the growth of the algae, the nitrogen compounds contained in the water to be treated are accumulated in the algae as they are, or as hydrocarbons or proteins containing nitrogen.

<<Usefulness>>

The water treatment system 10 according to the embodiment described above is useful in terms of making non-microplastic aquatic products and safe and secure seafood corresponding to pesticide-free (organic) produce from land. In particular, the water treatment system 10 is preferably introduced into an onshore aquaculture facility in order not to intake microplastics in the environment.

Hereinabove, although the embodiments of the present invention have been described, the embodiments are examples of the present invention, and various configurations other than the above can be adopted.

<Means for Recovering Algae>

In the embodiment described above, the algae are recovered using a filter, but means for recovering the algae is not limited thereto.

Algae lighter than the water to be treated may be recovered from an upper part of the water to be treated using a difference between the specific gravity of the water to be treated and the specific gravity of the algae. In addition, algae heavier than the water to be treated may be recovered from a lower part of the water to be treated.

In addition, the water to be treated in the water treatment tank 30 is allowed to pass through a bag-shaped net, such that algae to which microplastics are attached and algae that are sufficiently grown and increased in size, which are contained in the water to be treated in the water treatment tank 30 may be trapped.

In addition, the algae in the water treatment tank 30 may be scraped out using a landing net or the like.

<Water to be Treated>

In the embodiment described above, the aquaculture water used in the aquaculture tank 20 is exemplified as the water to be treated that is treated in the water treatment tank 30, but the water to be treated is not limited thereto, and treated sewage water, industrial wastewater, domestic wastewater, agricultural wastewater, wastewater from waste treatment plants, wastewater from power plants, and the like may be used as water to be treated.

<Water Purification Other than Nitrogen Compounds>

In the embodiment described above, the nitrogen compounds are removed from the water to be treated as the algae grow, but a compound to be removed from the water to be treated is not limited as long as it is a compound that can be taken into cells of the algae. For example, one or more selected from the group consisting of heavy metals such as cadmium, cobalt, nickel, copper, zinc, and manganese, radioactive substances such as radioactive cesium, radioactive strontium, and radioactive iodine, phosphorus compounds such as a reduced phosphorus compound and a phosphoric acid ester compound, and potassium compounds such as potassium chloride, potassium sulfate, and potassium nitrate can be removed from the water to be treated to achieve water purification.

<Production of Useful Substance>

In the present embodiment, not only recovery of the microplastics and removal of the nitrogen compounds are achieved, but also a useful substance is produced. Examples of the useful substance produced in accordance with the growth of the algae include one or more selected from the group consisting of astaxanthin, β-carotene, lutein, DHA, EPA, paramylon, wax ester, hydrogen, biodiesel, bioethanol, chlostanin, and squalene. Application to various uses can be achieved by separating and purifying the useful substance.

An aspect of the present invention is a water treatment method for purifying water to be treated containing microplastics and nitrogen compounds. The water treatment method includes a step of allowing algae having a microplastic adsorption and recovery ability to be present in the water to be treated, recovering the microplastics from the water to be treated containing the microplastics and the nitrogen compounds, and removing the nitrogen compounds from the water to be treated.

In the aspect, the algae may be algae that secrete a sticky substance. The sticky substance may be a polysaccharide. The algae may be at least one selected from diatoms, brown algae, dinoflagellates, chlorarachniophyte algae, green algae, red algae, conjugating green algae, euglena algae, and blue-green algae. The water treatment method may further include a step of recovering the algae used for purification of the water to be treated; and a step of replenishing new algae. In addition, a timing of recovering the algae may be set according to a growth degree of the algae.

EXAMPLES

Hereinafter, the present invention will be described with reference to Examples and Comparative Examples, but the present invention is not limited thereto.

<<Culture of Algae>>

Algae (see Table 1) used in experiments were cultured at a scale of 1 L. At this time, a turbidity was measured and recorded using a turbidity meter (CO8000 Biowave). For example, 7,000 cells/ml of the genus Skeletonema or algae of about 5 to 10 μm were used as a standard. Note that when the number of algal cells was more than 7,000 cells/ml, the solution was diluted with a medium or the like. On the other hand, when the number of algal cells was less than 7,000 cells/ml, the supernatant was removed after 2 to 3 hours for adjustment. Thereafter, 19.648 ml of the well suspended culture solution was placed in a 70 ml cell culture flask (three flasks were prepared). In addition, as a control, 19.648 ml of a medium was placed in a new 70 ml cell culture flask {four flasks were prepared (one of the four flasks was used for creating a calibration curve)}. Furthermore, about 20 ml of a well-suspended culture solution was prepared for baseline correction when the absorbance was measured with an ultraviolet-visible light spectrophotometer. Next, 352 μl (5.68×10⁸ beads/ml) of a 2 μm bead solution (an aqueous solution in which beads formed of polyvinyl chloride (PVC) simulating microplastics were dispersed) was placed in a 70 ml cell culture flask containing the culture solution. Thereafter, mixing was performed by pipetting, and the mixture was placed in an artificial climate chamber at 20° C. to perform stationary culture (for 1 day). Note that FIG. 7 is an enlarged photograph of various algae used. In the drawing, a dotted line indicates the cell surface, and a solid line indicates the interface of the sticky substance. In addition, Table 2 shows the amount of sticky components calculated by the method described in the general description.

TABLE 1

| Classification of algae | Species name | Size |
|---|---|---|
| Diatoms | *Achnanthes kuwaitensis* | 12-40 μm |
| Blue-green algae | *Calothrix parasitica* | −11 μm |

TABLE 1-continued

| Classification of algae | Species name | Size |
|---|---|---|
| Euglena | *Euglena mutabilis* | −63 μm |
| Brown algae | *Acinetospora crinita* | 17 μm |
| Green algae | *Chlamydomonas kuwadae* | 10-25 μm |
| Conjugating green algae | *Closterium ehrenbergii* | 80-500 μm |
| Dinoflagellates | *Pyrocystis fusiformis* | 400 μm |

TABLE 2

| | Species used for analysis | Amount of sticky substance |
|---|---|---|
| Diatoms | *Achnanthes kuwaitensis* | 5 times |
| Blue-green algae | *Calothrix parasitica* | 35 times |
| Euglena algae | *Euglena mutabilis* | 1 times |
| Brown algae | *Acinetospora crinita* | — (could not be confirmed) |
| Green algae | *Chlamydomonas kuwadae* | 7 times |
| Conjugating green algae | *Closterium ehrenbergii* | 12 times |
| Dinoflagellates | *Pyrocystis fusiformis* | 0.39 times |

<<Microplastic Recovery Test>>

Figure 6:
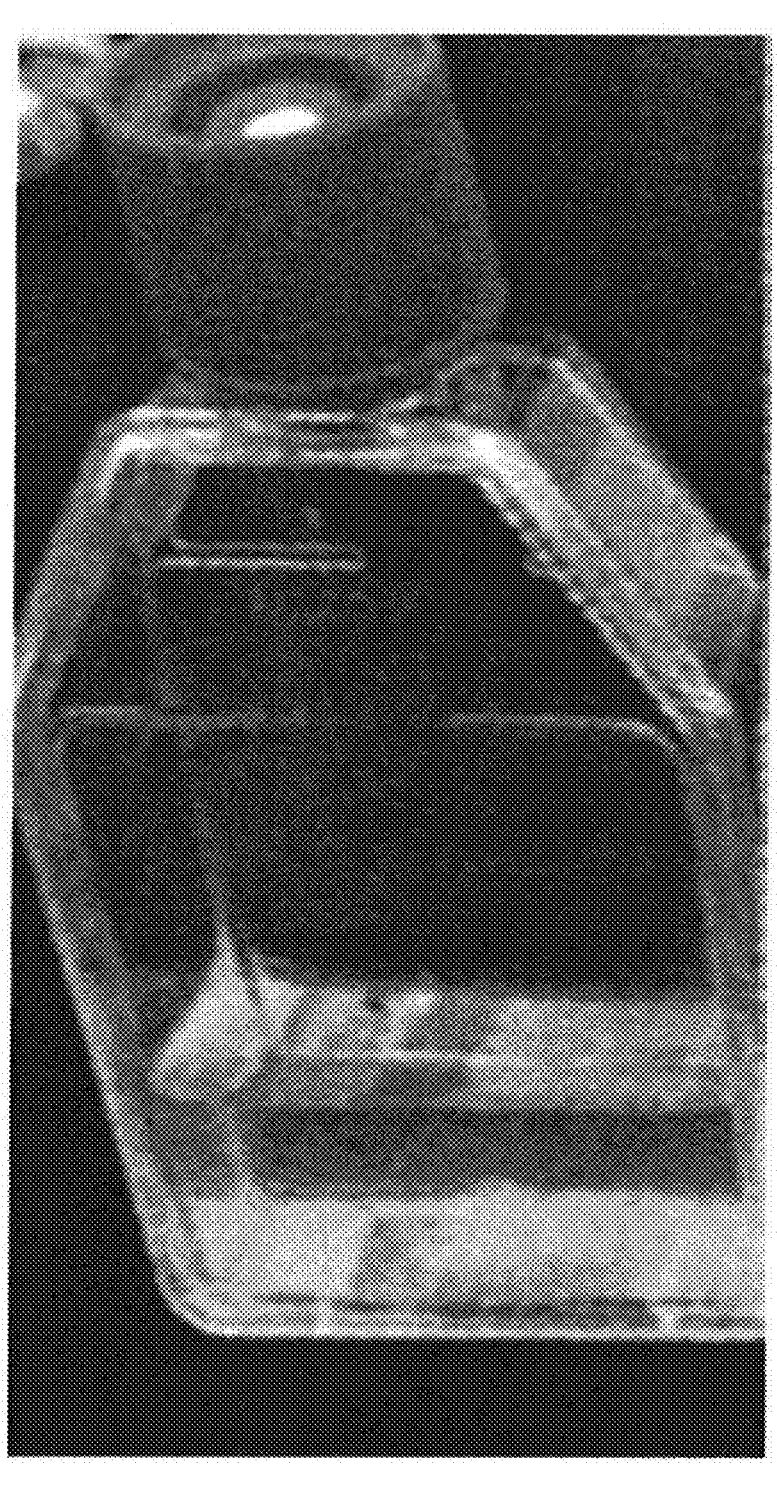
FIG. 6 is a view (photograph) illustrating a state in which a precipitate is confirmed after adsorption of microplastics in Examples.

The flask obtained in <<Culture of Algae>> described above {solution at a final concentration of 1×10⁷ beads (2 μm)/ml in which each algae were cultured} was taken from the artificial climate chamber so as not to be shaken. At this time, as illustrated in FIG. 6, a precipitate was confirmed. Thereafter, the mixture was suspended by swirling and pipetting. Next, a 50 μm cell strainer (50 μm pluriStrainer) was set and labeled in a 50 ml tube using a connector ring (prepared in an amount equal to the number of cell culture flasks other than the flask for the calibration curve). Then, the entire culture flasks were filtered under reduced pressure using a syringe with each cell strainer (not filtered for the calibration curve). Thereafter, a primary filtered sample was capped and stored on a laboratory table. Then, a calibration curve was created, and a bead dilution series for the calibration curve was created in order to estimate a bead recovery rate by algae. Specifically, a medium to which no beads were added was set to a bead concentration of 0, a ½ dilution was repeated from a stock concentration of 1.00× 10⁷ beads/ml, and 3.13×10⁵ beads/ml, 6.25×10⁵ beads/ml, 1.25×10⁶ beads/ml, 2.50×10⁶ beads/ml, and 5.00×10⁶ beads/ml were prepared.

<<Microplastic Recovery Measurement Test>>

Absorbance measurement at 267 nm, which was fluorescence of beads, was performed using an ultraviolet-visible light spectrophotometer BioSpec-Mini (Shimadzu Corporation). At this time, in order to estimate a bead recovery rate of the algae, a bead dilution series for a calibration curve was measured and a linear regression equation was obtained by creating a calibration curve. Then, absorbance was measured using a 50 μm cell strainer permeated solution of an algae culture medium+a bead solution as a sample, and a concentration of beads in the permeated solution was calculated from the linear regression equation obtained by the calibration curve. Absorbance was measured using a 50 μm cell strainer permeated solution of a medium+a bead solution without the same culture operation as a control, and a concentration of beads in the permeated solution was calculated from the linear regression equation obtained by the calibration curve. Then, a recovery rate of the beads was calculated from the concentration of the beads in the sample and the concentration of the beads in the control. The results are shown in Table 3.

TABLE 3

|  | Species used for analysis | Recovery rate for treatment time of 1 Day |
|---|---|---|
| Diatoms | Achnanthes kuwaitensis | 25% |
| Blue-green algae | Calothrix parasitica | 38% |
| Euglena algae | Euglena mutabilis | 18% |
| Brown algae | Acinetospora crinita | 10% |
| Green algae | Chlamydomonas kuwadae | 6% |
| Conjugating green algae | Closterium ehrenbergii | 5% |
| Dinoflagellates | Pyrocystis fusiformis | 17% |

Reference
Recovery rate of conjugating green algae:
Performed at number of cells of 240 cells/ml
Recovery rate of brown algae:
Performed at number of cells of 106 cells/ml for recovery time of 4 hrs
Recovery rate of green algae:
Performed for recovery time of 4 hrs <<MP Removal and Nitrogen Removal Test>>

As an algal species, diatom *S. tropicum* was used, and culture was performed in 200 ml of a medium (f/2, however, sodium nitrate was changed to 750 mg/L, which was 10 times the usual concentration) to examine the nitrogen removal effect. Table 4 shows the components of the medium (f/2). In addition, Table 5 shows the components of f/2 metals contained in the medium (f/2).

TABLE 4

| f/2 | |
|---|---|
| NaNO$_3$ | 75 mg |
| NaH$_2$PO$_4$•2H$_2$O | 0.6 mg |
| Vitamin B$_{12}$ | 0.05 µg |
| Biotin | 0.05 µg |
| Thiamine HCl | 10 µg |
| Na$_2$SiO$_3$•9H$_2$O | 1 mg |
| f/2 metals | 0.1 mL |
| Seawater | 99.9 mL |

TABLE 5

| f/2 metals | |
|---|---|
| Na$_2$EDTA•2H$_2$O | 440 mg |
| FeCl$_3$•6H$_2$O | 316 mg |
| CoSO$_4$•7H$_2$O | 1.2 mg |
| ZnSO$_4$•7H$_2$O | 2.1 mg |
| MnCl$_2$•4H$_2$O | 18 mg |
| CuSO$_4$•5H$_2$O | 0.7 mg |
| Na$_2$MoO$_4$•2H$_2$O | 0.7 mg |
| Distilled water | 100 mL |

For each of the following samples, a culture experiment was performed, and a temporal change in each concentration of the ammonia nitrogen concentration, the nitrite nitrogen concentration, and the nitrate nitrogen concentration with the lapse of culture time was examined.

Sample in which beads at a final concentration of $1 \times 10^7$ beads (2 µm)/ml were added to the medium described above, and diatoms having the number of cells of $5.0 \times 10^5$ corresponding to the number of cells in a logarithmic growth phase were further added (hereinafter, referred to as a "diatom+MP" sample)

Sample in which diatoms having the number of cells of $5.0 \times 10^5$ cells corresponding to the number of cells in a logarithmic growth phase were added to the medium described above (hereinafter, referred to as a "diatom" sample)

Control (water)

Specifically, the supernatant of the flask subjected to stationary culture was taken, and measurement was performed using a kit (digital pack test) manufactured by KYORITSU CHEMICAL-CHECK Lab., Corp. At the time 0 of the culture, the medium before adding diatoms was used, and thereafter, measurement was performed once a day (around at 11:00 AM). Tables 6, 7, and 8 show the measurement results of the ammonia nitrogen concentration, the nitrite nitrogen concentration, and the nitrate nitrogen concentration (average value of N=2), respectively. Note that the removal efficiency of the microplastics of the "diatom+MP" sample was examined.

TABLE 6

| | | Diatom + MP | Diatom | Control |
|---|---|---|---|---|
| Concentration | Culture time: 0 hours | 2.25 | 1.98 | 0.38 |
| of ammonia | Culture time: 24 hours | 1.58 | 1.42 | 0.30 |
| nitrogen | Culture time: 48 hours | 0.38 | 0.35 | 0.50 |
| (mg/L) | Culture time: 72 hours | 0.40 | 0.36 | 0.73 |
| | | N = 2. | N = 2 | N = 2 |
| | | MP removal efficiency 48% | | |

TABLE 7

| | | Diatom + MP | Diatom | Control |
|---|---|---|---|---|
| Concentration | Culture time: 0 hours | 0.24 | 0.22 | 0.16 |
| of nitrite | Culture time: 24 hours | 0.13 | 0.13 | 0.15 |
| nitrogen | Culture time: 48 hours | 0.05 | 0.05 | 0.15 |
| (mg/L) | Culture time: 72 hours | 0.01 | 0.01 | 0.16 |
| | | N = 2, | N = 2 | N = 2 |
| | | MP removal efficiency 53% | | |

TABLE 8

| | | Diatom + MP | Diatom | Control |
|---|---|---|---|---|
| Concentration | Culture time: 0 hours | 4.52 | 4.68 | 2.94 |
| of nitrate | Culture time: 24 hours | 4.72 | 4.25 | 3.05 |
| nitrogen | Culture time: 48 hours | 3.58 | 3.98 | 3.15 |
| (mg/L) | Culture time: 72 hours | 2.95 | 2.94 | 3.92 |
| | | N = 2, | N = 2 | N = 2 |
| | | MP removal efficiency 43% | | |

From the above results, both the "diatom+MP" sample and the "diatom" sample showed a sufficient denitrification effect for the ammonia nitrogen and the nitrite nitrogen for 24 hours. The "diatom+MP" sample showed a sufficient denitrification effect for the nitrate nitrogen for 48 hours, and the "diatom" sample showed a sufficient denitrification effect for the nitrate nitrogen for 24 hours. In addition, it was confirmed that it was possible to recover the microplastics and remove the nitrogen compounds from the water to be treated by using the algae.

Embodiment B

Technical Field of Embodiment B

Embodiment B relates to a water treatment method and a water treatment system.

Background Art of Embodiment B

In recent years, as a part of global warming countermeasures, studies on a technique related to immobilization of carbon dioxide, which is considered to be a factor of global warming, have been advanced. For example, Patent Literature 1 discloses a technique for immobilizing carbon dioxide by carbonating carbon dioxide.

On the other hand, in recent years, there has been a problem that microplastics generated by, for example, crushing of plastics affect the environment. Therefore, there is a demand for a technique for recovering microplastics from sea water or fresh water.

Citation List of Embodiment B

Patent Literature

Patent Literature 1>>> JP 2021-070615 A

Outline of Embodiment B

Problems to be Solved by Embodiment B

Conventional techniques cannot achieve both immobilization of carbon dioxide and recovery of microplastics.

Embodiment B has been made in view of the above problems, and an object thereof is to provide a technique capable of achieving both immobilization of carbon dioxide and recovery of microplastics.

Solution to Problem in Embodiment B

An aspect of Embodiment B is a water treatment method. The water treatment method is a water treatment method for recovering microplastics from water to be treated containing the microplastics and carbon dioxide and immobilizing the carbon dioxide, the water treatment method including a step of allowing algae having a microplastic adsorption and recovery ability to be present in the water to be treated, recovering the microplastics from the water to be treated, and immobilizing carbon from the water to be treated into the algae.

The water treatment method of the aspect may further include a step of supplying carbon dioxide to the water to be treated. The water to be treated may be industrial wastewater. The algae may be algae that secrete a sticky substance. The sticky substance may be a polysaccharide. The algae may be at least one selected from diatoms, brown algae, dinoflagellates, chlorarachniophyte algae, green algae, red algae, conjugating green algae, euglena algae, and blue-green algae. The water treatment method may include a step of recovering the microplastics and recovering the algae used for immobilization of the carbon dioxide; and a step of replenishing new algae. A timing of recovering the algae may be set according to a growth degree of the algae.

Another aspect of Embodiment B is a water treatment system. The water treatment system is a water treatment system that recovers microplastics from water to be treated containing the microplastics and carbon dioxide and immobilizes the carbon dioxide, in which algae having a microplastic adsorption and recovery ability are allowed to be present in the water to be treated, the microplastics are recovered from the water to be treated, and the carbon dioxide is immobilized from the water to be treated into the algae.

The water treatment system of the aspect may include a step of supplying carbon dioxide to the water to be treated. The water to be treated may be industrial wastewater. The algae may be algae that secrete a sticky substance. The sticky substance may be a polysaccharide. The algae may be at least one selected from diatoms, brown algae, dinoflagellates, chlorarachniophyte algae, green algae, red algae, conjugating green algae, euglena algae, and blue-green algae. The water treatment system may include means for recovering the microplastics and recovering the algae used for immobilization of the carbon dioxide, and means for replenishing new algae. A timing of recovering the algae may be set according to a growth degree of the algae.

Advantageous Effects of Embodiment B

According to Embodiment B, a technique capable of achieving both immobilization of carbon dioxide and recovery of microplastics can be provided.

Mode for Carrying Out Embodiment B

Definition of Terms

<Water to Be Treated>

In the present specification, the water to be treated is water in which carbon dioxide is dissolved and microplastics are present, or water such as sea water, fresh water, or brackish water that may be present. Specific examples of the water to be treated include industrial water, treated sewage water, domestic wastewater, and agricultural wastewater.

<Microplastics>

In the present specification, the "microplastics" refer to particles of 0.1 μm or more and 5,000 μm or less (maximum length portion). However, plastics present (or possibly present) in the water to be treated as a target to be treated may include not only microplastics but also plastic particles of less than 0.1 μm and more than 5,000 μm. In addition, the majority of the microplastics (for example, 80% or more, 90% or more, or 95% or more of the total number of particles) are, for example, 0.1 μm or more, 0.5 μm or more, 1 μm or more, 2 μm or more, 3 μm or more, 4 μm or more, 5 μm or more, 6 μm or more, 7 μm or more, 10 μm or more, 50 μm or more, 100 μm or more, 500 μm or more, 1,000 μm or more, and 2,500 μm or more; and 2,500 μm or less, 1,000 μm or less, 500 μm or less, 100 μm or less, 50 μm or less, 10 μm or less, 9 μm or less, 8 μm or less, 7 μm or less, 6 μm or less, 5 μm or less, 4 μm or less, and 3 μm or less (maximum length portion). Note that, as is well known, examples of the microplastics include primary microplastics (plastics produced in micro size, for example, used for capsules of a facial cleanser, a softener, and a slow-release fertilizer) and secondary microplastics (large plastics are crushed and subdivided into micro sizes in a natural environment).

<Algae Having Microplastic Adsorption and Recovery Ability>

In the present specification, the "algae having a microplastic adsorption and recovery ability" refer to algae capable of reducing a concentration of the microplastics in the water to be treated when algae are present by a predetermined amount (for example, 10%, 20%, 30%, 40%, 50%, 60%, 70%, 80%, 90%, or 95%) or more relative to a concentration of the microplastics in the water to be treated when algae are not present. Here, examples of the algae having such properties include diatoms and brown algae belonging to stramenopiles, dinoflagellates belonging to Alveolata, chlorarachniophyte algae belonging to Rhizaria, green algae, red algae, and conjugating green algae belonging to Archaeplastida, euglena algae belonging to Excavata, and blue-green algae belonging to eubacteria that secrete a sticky substance; algae (for example, diatoms) having a physical structure (for example, a porous structure or a rough structure) that trap microplastics; and algae charged oppositely to microplastics. For example, microalgae have various shapes and sizes, but porous algae having a large surface area and algae that form filamentous colonies are present. Such a structure also has a function of trapping the microplastics.

Examples of the "algae that secrete a sticky substance" include diatoms and brown algae belonging to stramenopiles, dinoflagellates belonging to Alveolata, chlorarachniophyte algae belonging to Rhizaria, green algae, red algae, and conjugating green algae belonging to Archaeplastida, euglena algae belonging to Excavata, and blue-green algae belonging to eubacteria. Here, microalgae are known to release various sticky substances to the outside of cells. The sticky substance is typically a polysaccharide, and is, for example, a substance such as agarose or porphyran in the case of red algae such as agar and conjugating green algae, or alginic acid or fucose-containing polysaccharide in the case of brown algae such as kelp.

Here, the sizes of the algae are not particularly limited. However, considering that the sizes of the microplastics to be treated are 0.1 μm or more and 5,000 μm or less, it is preferable that the sizes of the microplastics are 5,000 μm or more (for example, in a case of algae that are linked or clustered, the size of the linked or clustered algae). However, the sizes of the algae may depend on the predominant sizes of the microplastics present in the water to be treated, and in this case, the assumed sizes of algae are, for example, 0.1 μm or more, 1 μm or more, 2 μm or more, 5 μm or more, 10 μm or more, 50 μm or more, 100 μm or more, 500 μm or more, 1,000 μm or more, and 2,500 μm or more, and 5,000 μm or less, 2,500 μm or less, 1,000 μm or less, 500 μm or less, 250 μm or less, 100 μm or less, 50 μm or less, 25 μm or less, 20 μm or less, 10 μm or less, 5 μm or less, and 1 μm or less. Note that the "size" used herein refers to a maximum diameter portion (for example, in a case of rod-shaped algae, a long diameter portion). In addition, algae having various sizes are present in the system, and the term "size" used herein refers to an average value of sizes of 100 algae randomly acquired.

The amount of the sticky substance secreted by the algae is preferably 0.25 times or more the volume of the sticky substance secreted extracellularly as compared with the cell size. Note that a method for measuring a volume of the sticky substance is as follows. 10 μL of a microalgae culture solution is added onto a glass slide. Furthermore, 10 μL of 5-fold diluted Indian ink is added, the Indian ink and the microalgae culture solution are mixed well, a volume of cells of the microalgae and a volume of a sticky substance outside the cells are measured under a microenvironment with a cover glass. According to the method by Kishimoto et al. {Kishimoto N., Ichise S., Suzuki K., Yamamoto C.: Analysis of long-term variation in phytoplankton biovolume in the northern basin of Lake Biwa. Limnology 14: 117-128 (2013)}, the cell volume is calculated by approximating each algae by an elliptical cylinder, an elliptical shape, a rectangular parallelepiped, or a combination thereof. With respect to the volume of the sticky substance outside of the cells, a volume including a portion not dyed with the Indian ink is calculated, and a volume of the sticky substance outside the cells is obtained by dividing the cell volume. FIG. 11 is a view illustrating the above procedure. In addition, algae having various sizes are present in the system, and the term "amount" used herein refers to an average value of sizes of 100 algae randomly acquired.

(Water Treatment System)

Figure 8:
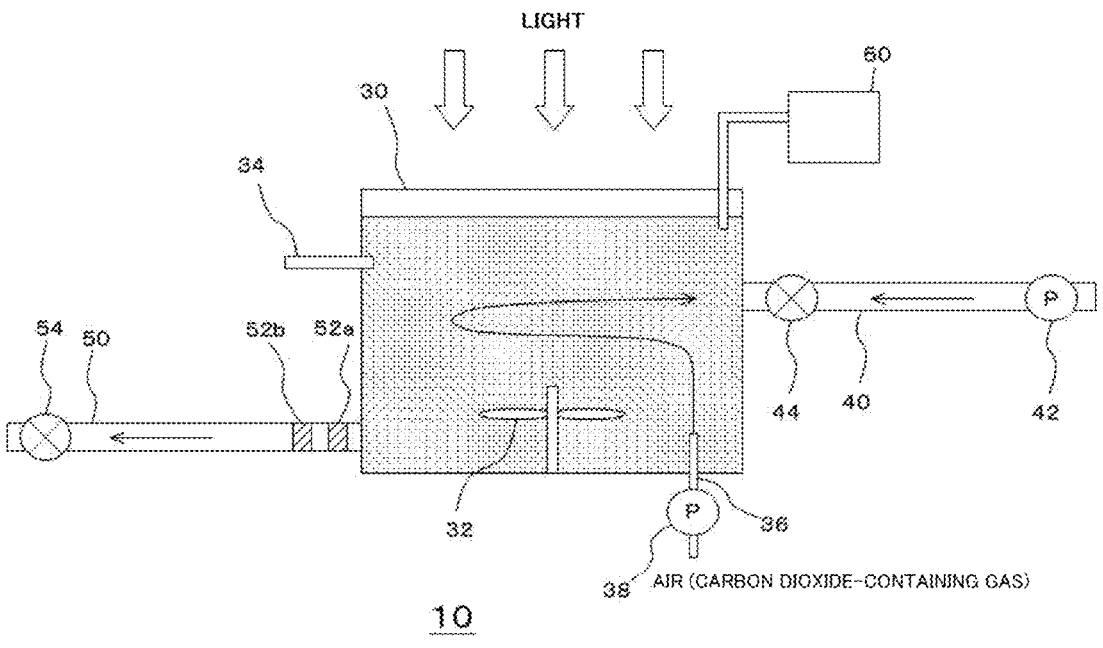
FIG. 8 is a block diagram illustrating a schematic configuration of a water treatment system according to an embodiment.

FIG. 8 is a view illustrating an outline of a water treatment system 10 according to a first embodiment. As illustrated in FIG. 8, the water treatment system 10 is an example of an industrial wastewater treatment system including a water treatment tank 30.

An introduction pipe 40 and a discharge pipe 50 are connected to the water treatment tank 30.

The water to be treated containing microplastics and carbon dioxide (for example, industrial wastewater discharged from factories, offices, or the like) is configured to flow into the water treatment tank 30 through the introduction pipe 40. The introduction pipe 40 is provided with a flow rate control pump 42. A flow rate of the water to be treated flowing through the introduction pipe 40 is controlled by the flow rate control pump 42.

In the water treatment tank 30, algae having a microplastic adsorption and recovery ability grow in the water to be treated introduced from the outside of the system. The microplastics contained in the water to be treated are recovered, and the carbon dioxide contained in the water to be treated is immobilized, by the algae.

Specifically, the microplastics contained in the water to be treated are adsorbed on an adsorptive substance secreted by the algae. The microplastics are removed from the water to be treated by removing the algae on which the microplastics are adsorbed using removing means such as a filter.

In addition, the carbon dioxide contained in the water to be treated is absorbed and immobilized when algae photosynthesize. Algae grow through a growth process in which the algae absorb carbon dioxide, synthesize an organic substance, and increase the number of cells. By removing the algae into which the carbon dioxide is immobilized, the carbon dioxide is removed from the water to be treated.

The water treatment tank 30 is configured to be able to appropriately add the algae stored in an algae reserve tank 60. The algae stored in the algae reserve tank 60 are algae before being used for recovering the microplastics and immobilizing the carbon dioxide, and are preferably algae immediately after germination or at an early stage of growth.

As described below, the water treatment tank 30 is provided with various mechanisms for securing an environment required for growth of algae.

<Mechanism for Irradiating Algae with Light>

The algae in the water treatment tank 30 are irradiated with light. The light radiated to the algae in the water treatment tank 30 is not limited to sun light, and may be artificial lighting such as an LED, a fluorescent lamp, or an incandescent lamp including light having a wavelength suitable for growth of the algae.

In the case of using artificial lighting, light may be constantly radiated (for 24 hours), but the irradiation time per day may be appropriately set (for example, for 10 to 12 hours) in accordance with growth and rest of the algae. By adjusting the irradiation time of the artificial lighting, the growth of the algae can be further promoted depending on the type of algae.

In addition, an installation place of the artificial lighting is not limited to above the water treatment tank 30, and may be the inside of the water treatment tank 30. By installing the artificial lighting inside the water treatment tank 30, more algae in the water treatment tank 30 can be irradiated with light as compared with a case where the artificial lighting is installed outside the water treatment tank 30. As a result, the growth of the algae is further promoted in the water treatment tank 30, and recovery of the microplastics and immobilization of the carbon dioxide can be more efficiently performed.

A stirring mechanism 32 is provided in the water treatment tank 30. The stirring mechanism 32 is operated, such that the algae and the water to be treated in the water treatment tank 30 are stirred, and the algae are dispersed in the entire water to be treated in the water treatment tank 30.

Specific examples of the stirring by the stirring mechanism 32 include stirring algae and water to be treated with a water flow generated by a pump, a propeller, a stirrer (for example, a magnetic stirrer), or the like, stirring algae and water to be treated with gas such as air or carbon dioxide, and stirring algae and water to be treated using a shaker that shakes the entire water treatment tank 30.

<Mechanism for Supplying Carbon Dioxide to Water to be Treated in Water Treatment Tank>

A gas introduction pipe 36 for supplying carbon dioxide to the water to be treated in the tank is installed in the water treatment tank 30. A gas flow rate regulation pump 38 is installed in the gas introduction pipe 36. Carbon dioxide or gas containing carbon dioxide (for example, air) is supplied to the water to be treated stored in the water treatment tank 30 by the gas flow rate regulation pump 38.

A discharge port of the gas introduction pipe 36 is preferably installed at a lower portion of the water treatment tank 30. According to this, with bubbling with carbon dioxide discharged from the gas introduction pipe 36, it is possible to achieve an effect of stirring the algae and the water to be treated while increasing a concentration of carbon dioxide in the water to be treated without providing a mechanism dedicated to stirring.

The supply of carbon dioxide to the water to be treated may be continuously performed so that a concentration of the carbon dioxide in the water to be treated is in a saturated state, but as illustrated in FIG. 8, a gas sensor 34 capable of measuring the concentration of the carbon dioxide in the water to be treated in the water treatment tank is provided, and a flow rate of gas discharged from the gas introduction pipe 36 may be regulated using the gas flow rate regulation pump 38 according to the concentration of the carbon dioxide measured by the gas sensor 34.

Next, suitable recovery conditions in a method for recovering the microplastics from the water to be treated containing the microplastics and the carbon dioxide and immobilizing the carbon dioxide in the water treatment tank 30 will be described.

A suitable concentration of the algae in the water treatment tank 30 varies depending on the concentration of the microplastics and the sizes of the microplastics in the water to be treated, the concentration of the carbon dioxide in the water to be treated, the type of algae used, and the like. This condition setting can be determined, for example, by conducting a model experiment described in Examples.

A suitable recovery time in the water treatment tank 30 varies depending on the concentration of the microplastics and the sizes of the microplastics in the water to be treated, the concentration of the carbon dioxide in the water to be treated, the type of algae used, the concentration of the microplastics and the concentration of the carbon dioxide targeted for reduction, and the like. This condition setting can be determined, for example, by conducting a model experiment described in Examples.

The microplastics used for recovering the microplastics and immobilizing the carbon dioxide in the water treatment tank 30 are recovered through the discharge pipe 50, and the water to be treated from which the carbon dioxide is removed is discharged to the outside of the system. The discharge pipe 50 is provided with a first filter 52a and a second filter 52b.

The first filter 52a has a function of removing algae to which microplastics are attached from the water to be treated. An aperture or pore size of the first filter 52a is not particularly limited as long as the algae to which the microplastics are attached can be removed, and is, for example, 5 μm.

Figure 9:
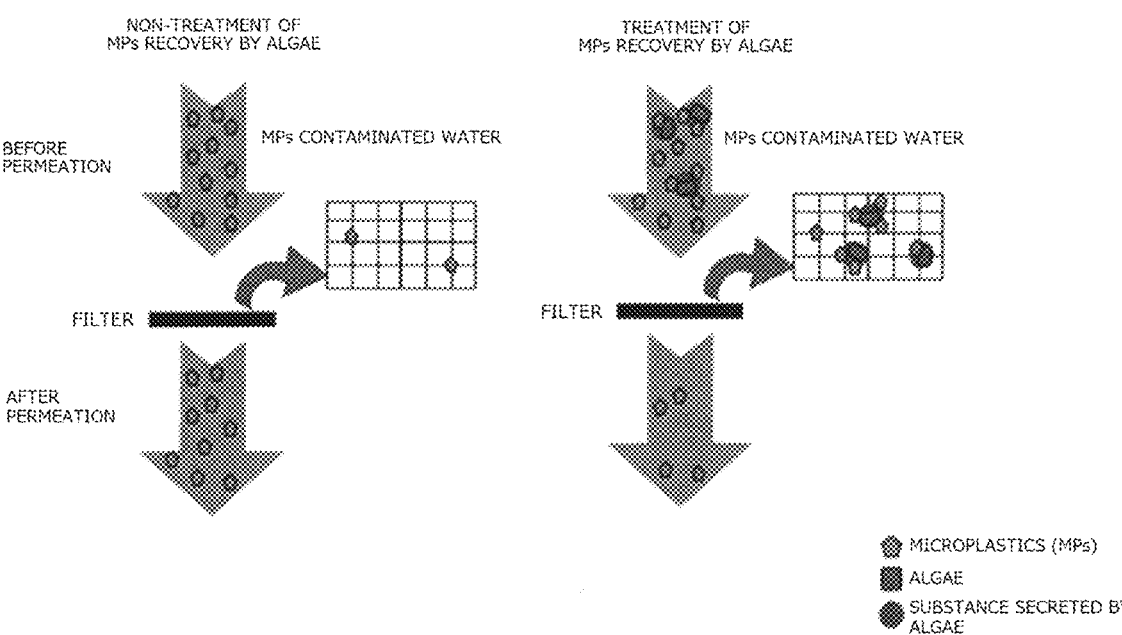
FIG. 9 is a conceptual view illustrating a state in which algae to which microplastics are attached are removed by a first filter.

FIG. 9 is a conceptual view illustrating a state in which the algae to which the microplastics are attached are removed by the first filter 52a. As illustrated in FIG. 9, algae to which microplastics are attached and algae to which microplastics are not attached are sorted by a substance secreted by the algae using the first filter 52a with an adjusted aperture or pore size. By allowing the water to be treated to pass through the first filter 52a, primary treated water from which the microplastics are removed is obtained.

The second filter 52b has a function of removing algae that have passed through the first filter 52a. An aperture or hole size of the second filter 52b is, for example, 5 μm although it depends on the type of algae used. The algae into which the carbon dioxide is immobilized that are contained in the primary treated water are sorted by the second filter 52b. In other words, by allowing the primary treated water to pass through the second filter 52b, secondary treated water from which the algae into which the carbon dioxide is immobilized are removed is obtained.

Examples of the filter used as the first filter 52a and the second filter 52b include a chemical fiber filter, a natural fiber filter, a metal filter such as a metal mesh, and a filter in a thread-like or paper-like form.

<Stirring Control>

The stirring of the algae and the water to be treated in the water treatment tank 30 by the stirring mechanism 32 may be continuously performed without being stopped in the process of growing the algae, but as described below, the stirring may be intermittently performed in accordance with the growth or state of the algae.

<<Stirring Control Method 1>>

A flow rate sensor (not illustrated) that measures a flow rate of the water to be treated introduced from the introduction pipe 40 is provided, and a stirring speed of the stirring mechanism 32 is changed according to the flow rate measured by the flow rate sensor. In this case, the stirring speed may be proportional to the flow rate. In addition, the stirring speed may be set stepwise according to the flow rate.

<<Stirring Control Method 2>>

A camera (not illustrated) is used to monitor a degree of dispersion of the algae in the water treatment tank 30. Based on the obtained image, it is determined whether or not algae are precipitated on the bottom of the water treatment tank 30, and in a case where it is determined that algae are precipitated on the bottom of the water treatment tank 30, the stirring speed is increased.

<Recovery and Replenishment of Algae>

Examples of a timing of recovering and replenishing the algae used for the recovery of the microplastics and the immobilization of the carbon dioxide include a case where a timing is set according to a growth degree of the algae and a case where a timing is set according to an ability of the filter.

<<Algae Recovery Timing 1>>

A state of the algae in the water treatment tank 30 is imaged by a camera (not illustrated). The camera may be installed above the water treatment tank 30 to image the algae in the water to be treated in the water treatment tank 30. In addition, the camera may be installed inside the water to be treated in the water treatment tank 30 to image the algae in the water to be treated in the water treatment tank 30 underwater.

A ratio of an area occupied by the algae per unit area in the captured image is calculated. In a case where the ratio occupied by the algae is equal to or more than a reference value, it is determined that the algae are sufficiently grown, and the first filter 52a and the second filter 52b are replaced. According to this, algae having a reduced ability to recover the microplastics and immobilize the carbon dioxide can be removed from the water treatment tank 30.

In addition, imaging by the camera may be performed at a predetermined interval, a growth curve of the algae may be drawn from the ratio of the area occupied by the algae per unit area in the captured image, and it may be determined that the algae are sufficiently grown at a time point when the cell growth reaches the end stage (for example, a time point when a growth log curve reaches a plateau) to replace the first filter 52a and the second filter 52b. According to this, algae having a reduced ability to recover the microplastics and immobilize the carbon dioxide can be removed from the water treatment tank 30.

<<Algae Recovery Timing 2>>

A turbidity of the water to be treated in the water treatment tank 30 may be measured as an index indicating a density of the algae using an absorptiometer (not illustrated). In a case where the measured turbidity is equal to or more than a reference value, it is determined that the algae are sufficiently grown, and the first filter 52a and the second filter 52b are replaced. According to this, algae having a reduced ability to recover the microplastics and immobilize the carbon dioxide can be removed from the water treatment tank 30.

<<Algae Recovery Timing 3>>

In a case where a fatty acid (oil) is produced as the algae grow, a concentration of the fatty acid in the water to be treated in the water treatment tank 30 may be measured. In a case where the measured concentration is equal to or more than a reference value, it is determined that the algae are sufficiently grown, and the first filter 52a and the second filter 52b are replaced. According to this, algae with low recovery of the microplastics and low immobilization of the carbon dioxide can be removed from the water treatment tank 30.

<<Algae Recovery Timing 4>>

In a case where a color of the algae is changed as the algae grow, a growth degree can be determined according to the color of the algae. Specifically, similarly to the above, a state of the algae in the water treatment tank 30 is imaged by the camera, it is determined whether the color of the imaged algae is changed from a color during growth (growth phase) (for example, green) to a color at the end of growth (for example, brown), and when it is determined that the color is at the end of growth, the first filter 52a and the second filter 52b are replaced. According to this, algae having a reduced ability to recover the microplastics and immobilize the carbon dioxide can be removed from the water treatment tank 30.

<<Algae Recovery Timing 5>>

The algae may be recovered by replacing the first filter 52a and the second filter 52b when a rate of the water flow flowing through the introduction pipe 40 or the discharge pipe 50 is less than a predetermined value. According to this, it is possible to recover the microplastics and immobilize the carbon dioxide while maintaining the filtering efficiency of the first filter 52a and the second filter 52b at a certain level or more.

<Algae Replenishment>

At a predetermined timing, after the algae grown to a certain level are removed, it is preferable to replenish the algae immediately after germination corresponding to the number of removed algae or at the initial stage of growth from the algae reserve tank 60. According to this, in a case where the efficiency of the recovery of the microplastics and the immobilization of the carbon dioxide is gradually reduced in accordance with the growth of the algae, the efficiency can be restored.

Figure 10:
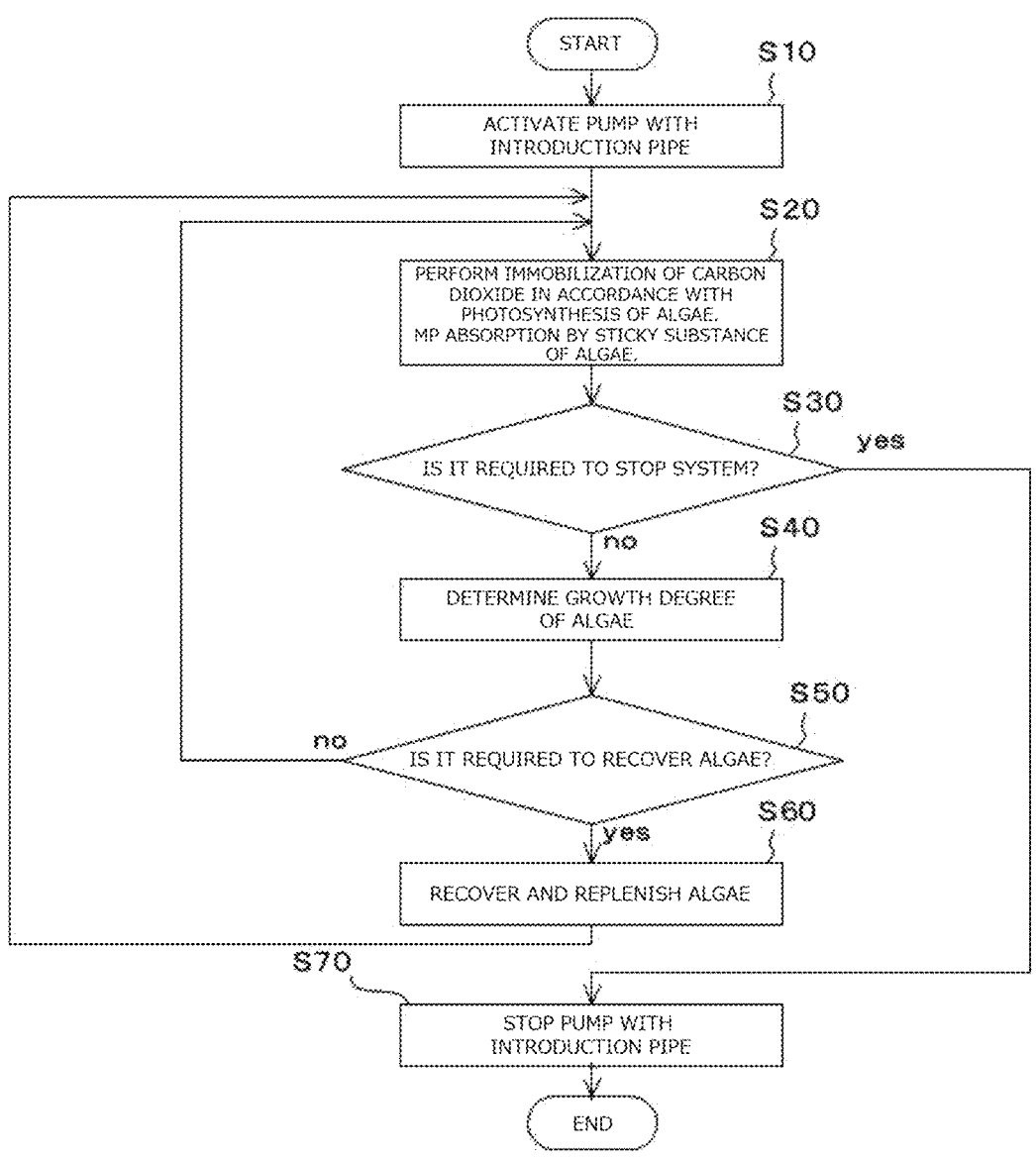
FIG. 10 is a flowchart illustrating a treatment related to recovery and replenishment of algae.

FIG. 10 is a flowchart illustrating a treatment related to recovery and replenishment of algae. As illustrated in FIG. 10, first, the flow rate control pump 42 installed in the introduction pipe 40 is activated, and the water to be treated is introduced into the water treatment tank 30 from the outside of the system (S10). In the water treatment tank 30 into which the water to be treated is introduced, immobilization of the carbon dioxide and recovery of the microplastics by the sticky substance secreted by the algae in accordance with the photosynthesis of the algae are performed (S20). Subsequently, it is determined whether or not it is required to stop the system when a predetermined time has elapsed after the start of activation (S30). When it is required to stop the system (yes in S30), the flow rate control pump 42 provided in the introduction pipe 40 is stopped. On the other hand, when the operation of the system is continued (no in S30), a growth degree of the algae is determined based on the image captured by the camera. As described above, the determination of the growth degree of the algae may be performed based on the ratio of the area occupied by the algae per unit area in the captured image, or may be performed based on the color of the captured algae. When it is determined that it is required to recover the algae based on the determined growth degree of the algae (yes in S50), the algae are recovered by replacing the filter 52a, and then new algae corresponding to the recovered algae are replenished to the water treatment tank 30 (S60), and the process returns to S20. On the other hand, when it is determined that it is not required to recover the algae (no in S50), and the process returns to S20.

<<Algae Composition>>

The algae used in the present embodiment may be an algae composition. Specifically, the algae are a group of the same or different kinds of algae. Here, the algae group is preferably housed in a container or the like, for example, in a state where the algae can survive (for example, in a liquid medium). In addition, algae that can survive freeze-drying may be handled in a dry form. Note that the composition may contain components other than algae, if necessary.

<Temperature Management>

When the water temperature of the water to be treated that is introduced from the outside of the system is different from an appropriate growth temperature of the algae cultured in the water treatment tank 30, the temperature of the water to be treated flowing into the water treatment tank 30 from the outside of the system may be adjusted.

Specifically, a temperature sensor that measures the water temperature of the water to be treated that is introduced from the outside of the system is provided, and the temperature of the water to be treated is heated or cooled to a desired water temperature suitable for the growth of the algae based on the temperature measured by the temperature sensor.

Examples of means for heating include heat exchange with surplus exhaust heat of sun light, geothermal heat, a garbage incineration plant, or the like, and heating by a heater. On the other hand, examples of means for cooling include heat exchange with environmental water such as rivers without energy and power consumption and cooling using energy and power (for example, heat exchange with a refrigerant).

<Adjustment of Nutrition, pH, and the Like>

Additive components contributing to the growth of the algae such as minerals or vitamins such as nutrient salts such as phosphorus, nitrogen, potassium, and sodium silicate may be appropriately added to the water to be treated in the water treatment tank 30. Examples of a timing of adding each of the additive components include a time point when a concentration of each of the additive components is measured and the concentration becomes less than a predetermined value. By appropriately adding the additive components to the water to be treated, the growth of the algae in the water treatment tank can be further promoted, and furthermore, the recovery efficiency of the microplastics and the immobilization efficiency of the carbon dioxide can be improved.

In addition, an acid (for example, acetic acid) or alkali (for example, sodium hydroxide) for adjusting a pH may be appropriately added to the water to be treated in the water treatment tank 30. Specifically, the pH of the water to be treated is measured, and an appropriate amount of acid or alkali may be added so that the measured pH value is within a predetermined range, for example, 5 to 9. As a result, the growth of the algae is further promoted in the water treatment tank 30, and recovery of the microplastics and immobilization of the carbon dioxide can be more efficiently performed.

Hereinabove, although Embodiment B has been described, Embodiment B is merely an example, and various configurations other than the above can be adopted.

<Means for Recovering Algae>

In the embodiment described above, the algae are recovered using a filter, but means for recovering the algae is not limited thereto.

Algae lighter than the water to be treated may be recovered from an upper part of the water to be treated using a difference between the specific gravity of the water to be treated and the specific gravity of the algae. In addition, algae heavier than the water to be treated may be recovered from a lower part of the water to be treated.

In addition, the water to be treated in the water treatment tank 30 is allowed to pass through a bag-shaped net, such that algae to which microplastics are attached and algae that are sufficiently grown and increased in size, which are contained in the water to be treated in the water treatment tank 30 may be trapped.

In addition, the algae in the water treatment tank 30 may be scraped out using a landing net or the like.

<Water to be Treated>

In the embodiment described above, the industrial wastewater is exemplified as the water to be treated that is treated in the water treatment tank 30, but the water to be treated is not limited thereto, and treated sewage water, domestic wastewater, agricultural wastewater, wastewater from waste treatment plants, wastewater from power plants, and the like may be used as water to be treated.

<Water Treatment (Water Purification) Other than Carbon Dioxide Immobilization>

In the embodiment described above, the carbon dioxide in the water to be treated is immobilized in accordance with the photosynthesis of the algae, and the carbon dioxide is removed from the water to be treated, but a compound to be removed from the water to be treated is not limited as long as it is a compound that can be taken into cells of the algae. For example, heavy metals such as cadmium, cobalt, nickel, copper, zinc, and manganese, radioactive substances such as radioactive cesium, radioactive strontium, and radioactive iodine, phosphorus compounds such as a reduced phosphorus compound and a phosphoric acid ester compound, potassium compounds such as potassium chloride, potassium sulfate, and potassium nitrate, and nitrogen compounds such as ammonia nitrogen, nitrite nitrogen, and nitrate nitrogen can be removed from the water to be treated to achieve a water treatment (water purification).

<Production of Useful Substance>

In the present embodiment, not only recovery of the microplastics and immobilization of the carbon dioxide are achieved, but also a useful substance is produced. Examples of the useful substance produced in accordance with the growth of the algae include astaxanthin, β-carotene, lutein, DHA, EPA, paramylon, wax ester, hydrogen, biodiesel, bioethanol, chlostanin, and squalene. Application to various uses can be achieved by separating and purifying the useful substance.

An aspect of Embodiment B is a water treatment method for recovering microplastics from water to be treated containing the microplastics and carbon dioxide and immobilizing the carbon dioxide. The water treatment method includes a step of allowing algae having a microplastic adsorption and recovery ability to be present in the water to be treated, recovering the microplastics from the water to be treated, and immobilizing the carbon dioxide from the water to be treated into the algae.

In the aspect, the water treatment method may further include a step of supplying carbon dioxide to the water to be treated. The water to be treated may be industrial wastewater. The algae may be algae that secrete a sticky substance. The sticky substance may be a polysaccharide. The algae may be at least one selected from diatoms, brown algae, dinoflagellates, chlorarachniophyte algae, green algae, red algae, conjugating green algae, euglena algae, and blue-green algae. The water treatment method may further include a step of recovering the algae used for purification of the water to be treated; and a step of replenishing new algae. In addition, a timing of recovering the algae may be set according to a growth degree of the algae.

Examples of Embodiment B

Hereinafter, Embodiment B will be described with reference to Examples and Comparative Examples, but Embodiment B is not limited thereto.

<<Culture of Algae>>

Using diatoms (*Skeletonema tropicum*, 7,000 cells/ml was used as a standard), stationary culture was performed for 3 days in an artificial climate chamber at 20° C. in 200 ml of the following culture solution under air addition condition and $CO_2$ addition ($CO_2$ saturated concentration), respectively (n=2).

(Culture Solution)

Medium 196.48 ml

Medium Components f/2 medium 1 L (NaNO$_3$: 75 mg, NaH$_2$PO$_4$: 6 mg, Vitamin B$_{12}$: 0.5 microgram, Biotin: 0.5 microgram, Thiamine HCl: 100 microgram, Na$_2$SiO$_3$.9H$_2$O: 10 mg, f/2 metals 1 ml (Na$_2$EDTA 2H$_2$O: 440 mg, FeCl$_3$.6H$_2$O: 316 mg, CoSO$_4$.7H$_2$O: 1.2 mg, ZnSO$_4$.7H$_2$O: 2.1 mg, MnCl$_2$.4H$_2$O: 18 mg, CuSO$_4$.5H$_2$O: 0.7 mg, Na$_2$MoO$_4$·2H$_2$O: 0.7 mg/distilled water))

3.52 ml ($5.68 \times 10^8$ beads/ml) of a 2 μm bead solution (an aqueous solution in which beads formed of polyvinyl chloride (PVC) simulating microplastics were dispersed)

Bead initial concentration: $1 \times 10^7$ beads/ml

<<Microplastic Recovery Test>>

The flask obtained in <<Culture of Algae>> described above {solution at a final concentration of $1 \times 10^7$ beads (2 μm)/ml in which each algae were cultured} was taken from the artificial climate chamber so as not to be shaken.

correction was performed. A concentration of the microplastics under $CO_2$ addition condition was reduced to about 39% of the concentration of the microplastics under air addition condition.

<<Cell Concentration Measurement>>

Absorbance ($OD_{750}$) at 750 nm was measured using an ultraviolet-visible light spectrophotometer BioSpec-Mini (Shimadzu Corporation). Furthermore, a calibration curve by a dilution series of the background and the measurement control was obtained based on the result of $OD_{750}$, and a cell concentration (turbidity) was calculated. Note that for baseline correction when measuring absorbance ($OD_{750}$) with ultraviolet-visible light spectrophotometer, about 200 ml of a well-suspended culture solution to which diatoms were not added was prepared and baseline correction was performed. The obtained results are shown in Table 1.

The cell concentration under the $CO_2$ addition condition is lower than the cell concentration under the air addition condition, which is presumed to be because the cell division is too fast and the size per cell is reduced.

<<Measurement of Number of Cells>>

The number of cells of algae after culture was counted using a hemocytometer. The obtained results are shown in Table 9. The number of cells under the $CO_2$ addition condition was about 2.4 times the number of cells under the air addition condition.

TABLE 9

| | Concentration of microplastics ($\times 10^6$ beads/ml) | Measurement of absorbance for beads ($OD_{267}$) | Concentration of cells ($\times 10^7$) | Measurement of absorbance for cells ($OD_{750}$) | Number of cells obtained with hemocytometer |
|---|---|---|---|---|---|
| Under air addition condition | 7.35 | 0.258 | 1.75 | 0.597 | 71 |
| Under $CO_2$ addition condition | 2.87 | 0.108 | 1.21 | 0.415 | 169 |

Thereafter, the mixture was suspended by swirling and pipetting. Next, a 50 μm cell strainer (50 μm pluriStrainer) was set and labeled in a 50 ml tube using a connector ring (prepared in an amount equal to the number of cell culture flasks other than the flask for the calibration curve). Then, the entire culture flasks were filtered under reduced pressure using a syringe with each cell strainer (not filtered for the calibration curve). Thereafter, a primary filtered sample was capped and stored on a laboratory table. Then, a bead dilution series for a calibration curve was created. Specifically, a medium to which no beads were added was set to a bead concentration of 0, a ½ dilution was repeated from a stock concentration of $1.00 \times 10^7$ beads/ml, and $3.13 \times 10^5$ beads/ml, $6.25 \times 10^5$ beads/ml, $1.25 \times 10^6$ beads/ml, $2.50 \times 10^6$ beads/ml, and $5.00 \times 10^6$ beads/ml were prepared.

<<Microplastic Concentration Measurement>>

Absorbance ($OD_{267}$) at 267 nm, which was fluorescence of beads, was measured using an ultraviolet-visible light spectrophotometer BioSpec-Mini (Shimadzu Corporation). At this time, in order to calculate a bead concentration, a bead dilution series for a calibration curve was measured and a linear regression equation was obtained by creating a calibration curve. Then, absorbance was measured using a 50 μm cell strainer permeated solution of an algae culture medium+a bead solution as a sample, and a concentration of beads in the permeated solution was calculated from the linear regression equation obtained by the calibration curve. Note that for baseline correction when measuring absorbance ($OD_{267}$) with ultraviolet-visible light spectrophotometer, about 200 ml of a well-suspended culture solution to which diatoms were not added was prepared and baseline From the above results, it was confirmed that under the $CO_2$ addition condition, as compared with the air addition condition, the number of cells was significantly increased, the amount of carbon immobilized was increased, and the recovery amount of the microplastics was increased.

Embodiment C

Technical Field of Embodiment C

Embodiment C relates to a carbonized combustion material and a method for producing a carbonized combustion material.

Background Art of Embodiment C

Biomass is an organic substance derived from animals and plants that can be used as energy such as fuel. For example, wood, dried plants, agricultural waste, livestock waste, sewage sludge, and the like correspond thereto. In recent years, as an alternative to exhaustible resources such as petroleum, a method of using these organic substances as an energy source has been searched for. Patent Literature 1 discloses a method for producing oil produced from algae using biomass resources.

On the other hand, in recent years, there has been a problem that microplastics generated by, for example, crushing of plastics affect the environment. It is known that microplastics enter a human body from a food chain or various routes and are accumulated little by little.

Citation List of Embodiment C

Patent Literature

<<<Patent Literature 1>>> JP 2019-041681 A

Outline of Embodiment C

Problems to be Solved by Embodiment C

An object of Embodiment C is to provide a novel bio-mass-derived combustion material using microplastics in the environment.

Solution to Problem in Embodiment C

As a result of conducting intensive studies on the above problems, the present inventors have completed the present invention.

That is, according to a first aspect of the present invention, there is provided a carbonized combustion material containing carbides of microplastics and carbides of algae on which the microplastics are adsorbed.

According to a second aspect of Embodiment C, there is provided a method for producing a carbonized combustion material, the method including a carbonization step of carbonizing a material to be carbonized containing algae on which microplastics are adsorbed.

In the first aspect, the microplastics may be microplastics adsorbed and recovered by the algae from water to be treated containing the microplastics.

In the first aspect and the second aspect, the algae may be fresh water algae.

In the first aspect and the second aspect, the algae may be algae that secrete a sticky substance.

In the first aspect and the second aspect, the sticky substance is a polysaccharide.

In the first aspect and the second aspect, the algae may be at least one selected from diatoms, brown algae, dinoflagellates, chlorarachniophyte algae, green algae, red algae, conjugating green algae, euglena algae, and blue-green algae.

In the first aspect, a sum of contents of the microplastics and the algae may be to 80 wt % based on a weight of anhydride before carbonization.

In the first aspect, a carbide of cellulose may be further contained.

In the first aspect, a shape of the carbonized combustion material may be a pellet shape.

In the second aspect, the method for producing a carbonized combustion material may further include, as a pre-step of the carbonization step, an adsorption step of allowing algae having a microplastic adsorption and recovery ability to be present in water to be treated containing microplastics.

In the second aspect, a temperature in the carbonization step may be 200 to 400° C.

In the second aspect, the method for producing a carbonized combustion material may further include, as a post-step of the carbonization step, a molding step of compression-molding the carbonized combustion material.

Effects of Embodiment C

According to Embodiment C, there is provided a novel biomass-derived combustion material using microplastics in the environment, which is useful for domestic power generation, coal-fired power generation, and the like.

Mode for Carrying Out Embodiment C

Hereinafter, Embodiment C will be described in detail. Hereinafter, a method for producing a carbonized combustion material according to the present embodiment will be described, and then the carbonized combustion material according to the present embodiment obtained by the production method will be described.

<<Method for Producing Carbonized Combustion Material>>

The method for producing a carbonized combustion material according to the present embodiment includes a carbonization step of carbonizing a material to be carbonized (composition for a carbonized combustion material) containing algae on which microplastics are adsorbed.

<Microplastics>

The material to be carbonized according to the present embodiment contains microplastics. The "microplastics" refer to plastic particles of 0.1 μm or more and 5,000 μm or less (maximum length portion). However, plastics present (or possibly present) in the material to be carbonized according to the present embodiment may include not only microplastics but also plastic particles of less than 0.1 μm and more than 5,000 μm. In addition, the majority of the microplastics (for example, 80% or more, 90% or more, or 95% or more of the total number of particles) are, for example, 0.1 μm or more, 0.5 μm or more, 1 μm or more, 2 μm or more, 3 μm or more, 4 μm or more, 5 μm or more, 6 μm or more, 7 μm or more, 10 μm or more, 50 μm or more, 100 μm or more, 500 μm or more, 1,000 μm or more, and 2,500 μm or more; and 2,500 μm or less, 1,000 μm or less, 500 μm or less, 100 μm or less, 50 μm or less, 10 μm or less, 9 μm or less, 8 μm or less, 7 μm or less, 6 μm or less, 5 μm or less, 4 μm or less, and 3 μm or less (maximum length portion). Note that, as is well known, examples of the microplastics include primary microplastics (plastics produced in micro size, for example, used for capsules of a facial cleanser, a softener, and a slow-release fertilizer) and secondary microplastics (large plastics are crushed and subdivided into micro sizes in a natural environment).

<Algae>

The material to be carbonized according to the present embodiment contains algae. The algae according to the present embodiment have a microplastic adsorption and recovery ability. The "algae having a microplastic adsorption and recovery ability" refer to algae capable of reducing a concentration of the microplastics in the water to be treated when algae are present by a predetermined amount (for example, 10%, 20%, 30%, 40%, 50%, 60%, 70%, 80%, 90%, or 95%) or more relative to a concentration of the microplastics in the water to be treated when algae are not present (the water to be treated will be described below). Here, examples of the algae having such properties include diatoms and brown algae belonging to stramenopiles, dinoflagellates belonging to Alveolata, chlorarachniophyte algae belonging to Rhizaria, green algae, red algae, and conjugating green algae belonging to Archaeplastida, euglena algae belonging to Excavata, and blue-green algae belonging to eubacteria that secrete a sticky substance; algae (for example, diatoms) having a physical structure (for example, a porous structure or a rough structure) that trap microplastics; and algae charged oppositely to microplastics. For example, microalgae have various shapes and sizes, but porous algae having a large surface area and algae that form filamentous colonies are present. Such a structure also has a function of trapping the microplastics. Here, algae are known to release various sticky substance to the outside cells thereof, and the sticky substance secreted by the algae is typically a polysaccharide, and is, for example, a substance such as agarose or porphyran in the case of red algae such as agar and conjugating green algae, or alginic acid or fucose-containing polysaccharide in the case of brown algae such as kelp.

The sizes of the algae according to the present embodiment are not particularly limited. However, considering that the sizes of the microplastics to be adsorbed are 0.1 μm or more and 5,000 μm or less, it is preferable that the sizes of the microplastics are 5,000 μm or more (for example, in a case of algae that are linked or clustered, the size of the linked or clustered algae). However, the sizes of the algae may depend on the predominant sizes of the microplastics present in the water to be treated, and in this case, the assumed sizes of algae are, for example, 0.1 μm or more, 1 μm or more, 2 μm or more, 5 μm or more, 10 μm or more, 50 μm or more, 100 μm or more, 500 μm or more, 1,000 μm or more, and 2,500 μm or more, and 5,000 μm or less, 2,500 μm or less, 1,000 μm or less, 500 μm or less, 250 μm or less, 100 μm or less, 50 μm or less, 25 μm or less, 20 μm or less, 10 μm or less, 5 μm or less, and 1 μm or less. Note that the "size" used herein refers to a maximum diameter portion (for example, in a case of rod-shaped algae, a long diameter portion). In addition, algae having various sizes are present in the system, and the term "size" used herein refers to an average value of sizes of 100 algae randomly acquired.

The amount of the sticky substance secreted by the algae according to the present embodiment is preferably 0.25 times or more the volume of the sticky substance secreted extracellularly as compared with the cell size. Note that a method for measuring a volume of the sticky substance is as follows. 10 μL of a microalgae culture solution is added onto a glass slide. Furthermore, 10 μL of 5-fold diluted Indian ink is added, the Indian ink and the microalgae culture solution are mixed well, a volume of cells of the microalgae and a volume of a sticky substance outside the cells are measured under a microenvironment with a cover glass. According to the method by Kishimoto et al. {Kishimoto N., Ichise S., Suzuki K., Yamamoto C.: Analysis of long-term variation in phytoplankton biovolume in the northern basin of Lake Biwa. Limnology 14: 117-128 (2013)}, the cell volume is calculated by approximating each algae by an elliptical cylinder, an elliptical shape, a rectangular parallelepiped, or a combination thereof. With respect to the volume of the sticky substance outside of the cells, a volume including a portion not dyed with the Indian ink is calculated, and a volume of the sticky substance outside of the cells is obtained by dividing the cell volume. FIG. 12 is a view illustrating the above procedure. In addition, algae having various sizes are present in the system, and the term "amount" used herein refers to an average value of sizes of 100 algae randomly acquired.

Examples of a growing place of the algae according to the present embodiment include, but are not limited to, sea water, fresh water, and brackish water, and it is preferable that the algae can inhabit fresh water. Algae grown in fresh water have a small content of impurities such as chlorine, such that harmful gas and the like are less likely to be generated during the carbonization step. The original growing place is not particularly limited, as long as the algae can grow in fresh water, but fresh water algae are preferable due to excellent growth efficiency. Examples of the fresh water algae include diatoms, green algae, brown algae, dinoflagellates, conjugating green algae, and euglena algae. In addition, the algae according to the present embodiment may be an algae composition. Specifically, the algae are a group of the same or different kinds of algae.

The algae according to the present embodiment may be algae immediately after being recovered from water or algae dried after being recovered. A known method can be used for drying the algae. Examples of a method for drying the algae include air drying, filtration, centrifugation, freeze drying, and spray drying.

A lower limit value of the sum of the contents of the algae and the microplastics in the material to be carbonized according to the present embodiment is preferably 20 wt % or more, more preferably 30 wt % or more, and still more preferably 40 wt % or more, based on the weight of anhydride before carbonization. On the other hand, an upper limit value of the sum of the contents of the algae and the microplastics in the material to be carbonized according to the present embodiment is preferably 80 wt % or less, more preferably 70 wt % or less, and still more preferably 60 wt % or less, based on the weight of anhydride before carbonization.

By setting the lower limit value and the upper limit value of the sum of the contents of the algae and the microplastics in the material to be carbonized, a carbonized combustion material can be obtained by sufficiently utilizing the algae and the microplastics. In addition, by setting the upper limit value and the lower limit value of the sum of the contents of the algae and the microplastics in the material to be carbonized, a carbonized combustion material can be obtained by suppressing the amount of the algae and microplastics used. The content of the algae in the material to be carbonized is preferably 20 to 80 wt %, and more preferably 30 to 60 wt %, based on the weight of anhydride before carbonization.

A ratio of the content of the algae to the content of the microplastics in the material to be carbonized according to the present embodiment depends on the amount of microplastics recovered by the algae, but is typically 0.001:1 to 0.5:1.

<Other Carbides>

Examples of components that can be contained in the material to be carbonized according to the present embodiment include cellulose serving as a carbon source of the carbonized combustion material. Examples of a material containing cellulose include a wooden material, agricultural waste, livestock waste, and sewage sludge, and wood pieces and bamboo pieces whose supply is stable are further preferable. Specific examples of the wooden material and the agricultural waste containing cellulose include bark, sawdust, wood flour (also referred to as sawdust), thinning wood, and rice straw discharged at the time of sawing. The algae contain a large amount of hydrocarbons and also contain moisture. Therefore, in order to gently advance the carbonization step, it is preferable to lower the water content in the material to be carbonized by a material having water absorbability or moisture retention, such as sawdust. The water content in the material to be carbonized is preferably 40 to 70 wt %, and more preferably 50 to 60 wt %. When the water content in the material to be carbonized is within such a range, the carbonization step can be gently advanced without occurrence of boiling over and the like.

Examples of components that can be contained in the material to be carbonized according to the present embodiment include hemicellulose and lignin that serve as carbon sources of the carbonized combustion material. Each material containing cellulose described above contains hemicellulose and lignin.

Examples of the material that can be contained in the material to be carbonized according to the present embodiment include plastics that do not correspond to the sizes of the microplastics described above. A carbide of the plastic contains a large amount of immobilized carbon similarly to carbides of the microplastics described below. Therefore, the carbonized combustion material containing a carbide of plastic has a high heat quantity. For example, plastic waste can be used as the plastic.

<Carbonization Step>

A known method can be used for carbonizing the material to be carbonized. Examples of the carbonization method include a method in which a material to be carbonized is disposed in a furnace capable of realizing an oxygen-free or oxygen-reduced state and the material to be carbonized is heated in the oxygen-free or oxygen-reduced state for a certain period of time. The carbonization according to the present embodiment may be high-temperature carbonization (the temperature in the furnace at the time of heating is, for example, 600 to 800° C.) at a relatively high temperature or low-temperature carbonization (the temperature in the furnace at the time of heating is, for example, 200 to 400° C.) at a relatively low temperature, but low-temperature carbonization that hardly generates a harmful gas is preferable. Specifically, the temperature in the furnace at the time of heating is preferably 200 to 400° C. and more preferably 250 to 400° C. In addition, the heating time varies depending on the material to be carbonized and the target water content, and can be arbitrarily set. The heating time can be, for example, 10 minutes or longer, 20 minutes or longer, 30 minutes or longer, 1 hour or longer, and 3 hours or longer.

The algae and the like contained in the material to be carbonized according to the present embodiment may contain a volatile organic substance. In a case of low-temperature carbonization for a short time (also referred to as semi-carbonization), since a volatile organic substance having a boiling point equal to or higher than the furnace temperature remains in the carbide, the energy yield (ratio of fuel energy to raw material and input energy) is improved. On the other hand, a volatile organic substance volatilized during carbonization (also referred to as combustion gas) can be separately recovered and used as a liquid combustion material.

<Adsorption Step>

The method for producing a carbonized combustion material according to the present embodiment may further include, as a pre-step of the carbonization step, an adsorption step of allowing algae having a microplastic adsorption and recovery ability to be present in water to be treated containing microplastics. That is, according to the method for producing a carbonized combustion material according to the present embodiment, microplastics in the environment can be recovered, and the recovered microplastics and the used algae can be reused as a carbonized combustion material.

The "water to be treated" is not particularly limited, and is, for example, water in which microplastics are present or water that may be present. Examples thereof include sea water, fresh water, and brackish water. Specific examples of the water to be treated include industrial water, industrial wastewater, treated sewage water, domestic wastewater, and agricultural wastewater. More specific examples thereof include wastewater from a waste treatment plant and wastewater from a power plant. As described above, the algae according to the present embodiment are preferably fresh water algae, and the water to be treated is preferably fresh water.

A suitable concentration of the algae in the system varies depending on the concentration of the microplastics, the sizes of the microplastics, the type of algae used, and the like.

A suitable absorption time in the system varies depending on the concentration of the microplastics, the sizes of the microplastics, the type of algae used, the concentration of the microplastics targeted for reduction, and the like. This condition setting can be determined, for example, by conducting a model experiment described in Examples. The algae after adsorption can be recovered using a filter or the like installed in the system.

In the embodiment described above, the microplastics are removed from the water to be treated by the algae, but a compound to be removed from the water to be treated is not limited as long as it is a compound that can be taken into cells of the algae. For example, heavy metals such as cadmium, cobalt, nickel, copper, zinc, and manganese, radioactive substances such as radioactive cesium, radioactive strontium, and radioactive iodine, phosphorus compounds such as a reduced phosphorus compound and a phosphoric acid ester compound, and nitrogen compounds such as ammonia nitrogen, nitrite nitrogen, and nitrate nitrogen can be removed from the water to be treated to achieve a water treatment (water purification).

<Molding Step>

The method for producing a carbonized combustion material according to the present embodiment may further include, as a post-step of the carbonization step, a molding step of compression-molding the carbonized combustion material. Any known method can be used for molding. As a molding method, for example, a pellet molding machine can be used. The pellet-like carbonized combustion material according to the present embodiment has, for example, a substantially cylindrical shape, and can have a diameter D of 3 to 20 mm, a length L of 3 to 50 mm, and a bulk density BD of 500 of 900 kg/m$^3$. It is preferable that the pellet-like carbonized combustion material according to the present embodiment has a diameter (D: 6±1 mm or 8±1 mm), a length (3.15 mm<L≤40 mm), and a bulk density (650 kg/m$^3$≤BD≤750 kg/m$^3$) according to wood pellet quality standards specified by Japan Wood Pellet Association. When the carbonized combustion material is within such a range, the carbonized combustion material can be used for general-purpose pellet combustion equipment such as a pellet stove and a commercial boiler.

<<Carbonized Combustion Material>>

The carbonized combustion material according to the present embodiment is a carbonized combustion material containing carbides of microplastics and carbides of algae on which the microplastics are adsorbed. In the carbonized combustion material according to the present embodiment, the microplastics and the algae are as described above. The carbonized combustion material according to the present embodiment can be obtained by the production method described above.

A water content of the carbonized combustion material according to the present embodiment is preferably 30 wt % or less, more preferably 20 wt % or less, and still more preferably 10 wt % or less. When the water content is within such a range, large energy can be obtained when the carbonized combustion material is combusted.

In the carbonized combustion material according to the present embodiment, moisture and volatile organic substances are reduced by carbonization, and a ratio of immobilized carbon may be, for example, 10 wt % or more, 20 wt % or more, 30 wt % or more, 40 wt % or more, 50 wt % or more, or 60 wt % or more on an anhydrous basis. A content of the immobilized carbon in the carbonized combustion material can be measured, for example, in accordance with JIS M 8812:2004. The carbonized combustion material according to the present embodiment contains carbides of microplastics and carbides of algae on which the microplastics are adsorbed. When the microplastics are carbonized, carbides mainly composed of gases such as hydrocarbon, carbon monoxide, and hydrogen and immobilized carbon are generated. In addition, as described above, the algae contain a large amount of hydrocarbons, and may also contain moisture and volatile organic substances. When the algae are carbonized, moisture and some volatile organic substances are volatilized, carbides are generated, and the remaining volatile organic substances remain. A ratio of the immobilized carbon in the carbide after carbonization is preferably 40 wt % or more on an anhydrous basis. The carbonized combustion material in which the immobilized carbon is within such a ratio has a high heat quantity. Such a carbonized combustion material using biomass resources can be used as an alternative to fossil fuels such as gasoline.

The carbonized combustion material according to the present embodiment has a heat quantity of 10 to 20 mega J/kg on an anhydrous basis, and has a heat quantity equivalent to that of conventional carbonized wood pellets. The heat quantity of the carbonized combustion material can be measured, for example, in accordance with JIS M 8814: 2003. The carbonized combustion material according to the present embodiment can be used for, for example, domestic power generation such as a small domestic power generator and a charcoal stove, and coal-fired power generation using a large boiler.

A shape of the carbonized combustion material according to the present embodiment may be a pellet shape. The pellet-like carbonized combustion material is compacted and has high combustion efficiency per volume, and thus is excellent in transportation efficiency.

In addition, the carbonized combustion material according to the present embodiment can also be used as a soil improving material. A carbonized combustion material having pores can improve water permeability and air permeability of soil. In addition, an acidity of the soil can be adjusted to a target pH.

Hereinabove, although Embodiment C has been described, Embodiment C is merely an example, and various configurations other than the above can be adopted.

Examples of Embodiment C

<Culture of Algae>

Diatoms (*Skeletonema tropicum*) were first pre-cultured using a 500 mL cell culture flask. As the medium, a f/2 medium (composition is described in Table 10; composition of f/2 metals contained in the f/2 medium is described in Table 11) was used, and algae were seeded in 200 mL of the medium so that the number of algae cells at the start of culture was 7,000 cells/mL. The algae were placed in an artificial climate chamber 20° C. and statically cultured for 14 days to obtain a pre-culture flask. 20 pre-culture flasks were prepared, and a total of 4 L of a seed culture solution was prepared. Subsequently, 400 L of artificial sea water was prepared in each of two 500 L culture tanks. An air pump (Zensui RLP-100) was bifurcated and connected to the culture tank, air was blown into the two tanks at an air volume of 140 L/min in total, and stirring was performed. 4 L of a seed culture solution was added to one 500 L culture tank, and the mixture was cultured for 7 days while being stirred by air. Finally, 5 g of polyvinyl chloride (PVC) powder having a particle size of about 120 μm as microplastics was added to each of the two 500 L culture tanks, and the culture was continued while being stirred by air for 3 days, thereby obtaining an algae culture solution and a control.

TABLE 10

| f/2 medium | |
| --- | --- |
| NaNO$_3$ | 75 mg |
| NaH$_2$PO$_4$•2H$_2$O | 6 mg |
| Vitamin B$_{12}$ | 0.5 μg |
| Biotin | 0.5 μg |
| Thiamine HCl | 100 μg |
| Na$_2$SiO$_3$•9H$_2$O | 10 mg |
| f/2 metals | 1 mL |
| Seawater | Fill up to 1 L |

TABLE 11

| f/2metals | |
| --- | --- |
| Na$_2$EDTA•2H$_2$O | 440 mg |
| FeCl$_3$•6H$_2$O | 316 mg |
| CoSO$_4$•7H$_2$O | 1.2 mg |
| ZnSO$_4$•7H$_2$O | 2.1 mg |
| MnCl$_2$•4H$_2$O | 18 mg |
| CuSO$_4$•5H$_2$O | 0.7 mg |
| Na$_2$MoO$_4$•2H$_2$O | 0.7 mg |
| Sterile water | Fill up to 100 ml |

<Microplastic Recovery Test>

50 mL of each of the algae culture solution and the control obtained in <Culture of Algae> described above was collected. The collected algae culture solution and control were suspended by swirling and pipetting. A 50 μm cell strainer (50 μm pluriStrainer) was set to a 50 mL tube using a connector ring. Subsequently, each of the collected algae culture solution and control was filtered under reduced pressure using a syringe with a cell strainer. A primary filtered sample obtained by filtration was capped and stored on a laboratory table. A PVC dilution series for a calibration curve was created. Specifically, artificial sea water to which PVC was not added was set to a PVC concentration of 0, and ½ dilution was repeated from $1.00×10^7$ PVC/mL of a PVC solution (the number of PVC powders in 1 mL) to prepare a PVC solution at concentrations of $3.13×10^5$ PVC/mL, $6.25×10^5$ PVC/mL, $1.25×10^6$ PVC/mL, $2.50×10^6$ PVC/mL, and $5.00×10^6$ PVC/mL.

<Microplastic Concentration Measurement>

Absorbance measurement at 267 nm, which was fluorescence of PVC, was performed using an ultraviolet-visible light spectrophotometer BioSpec-Mini (Shimadzu Corporation). At this time, in order to calculate a PVC concentration, a PVC dilution series for a calibration curve was measured and a linear regression equation was obtained by creating a calibration curve. Subsequently, the absorbance of the primary filtered sample was measured, and the PVC concentration in the primary filtered sample was calculated from the linear regression equation obtained by the calibration curve. Note that for baseline correction when measuring absorbance ($OD_{267}$) with ultraviolet-visible light spectrophotometer, about 200 mL of a well-suspended artificial sea water to which diatoms were not added was prepared and baseline correction was performed. From the PVC concentration in the culture solution in which the algae were cultured and the PVC concentration in the control, a PVC recovery rate by the algae was calculated. The PVC recovery rate by the algae at this time was 29.4%.

<Preparation of Carbonized Sample>

The algae on the surface layer were recovered from the algae culture solution obtained in <Culture of Algae> described above. The algae were filtered using a funnel-type filter. 15.14 g of the filtration residue and 5.12 g of the sawdust powder were mixed with each other. At this time, a water content of each of the filtration residue and the sawdust powder when measured using a water content meter were 83.3 wt % and 13.5 wt %, respectively. Note that the PVC weight was about 0.5 g or less, and a content of the algae in the mixture was 36 wt % based on the weight of anhydride. The mixture was placed in a crucible, capped, and allowed to stand in a muffle furnace (Koyo Lindbergh KBF-748). The furnace temperature was set to 300° C. and heating was performed for 1 hour to obtain a carbonized sample. In the same manner, heating was performed at a furnace temperature of 300° C. for 30 minutes and at a furnace temperature of 400° C. for 1 hour to obtain a carbonized sample. A weight of each carbonized sample was set and a weight yield was measured. The results at this time are shown in Table 12.

TABLE 12

|  | Furnace temperature 300° C. for | Furnace temperature 300° C. for | Furnace temperature 400° C. for |
| Carbonization condition | 1 hour | 30 minutes | 1 hour |
| --- | --- | --- | --- |
| Weight yield | 15 wt % | 18 wt % | 12 wt % |

<Analysis of Carbides>

Figure 13:
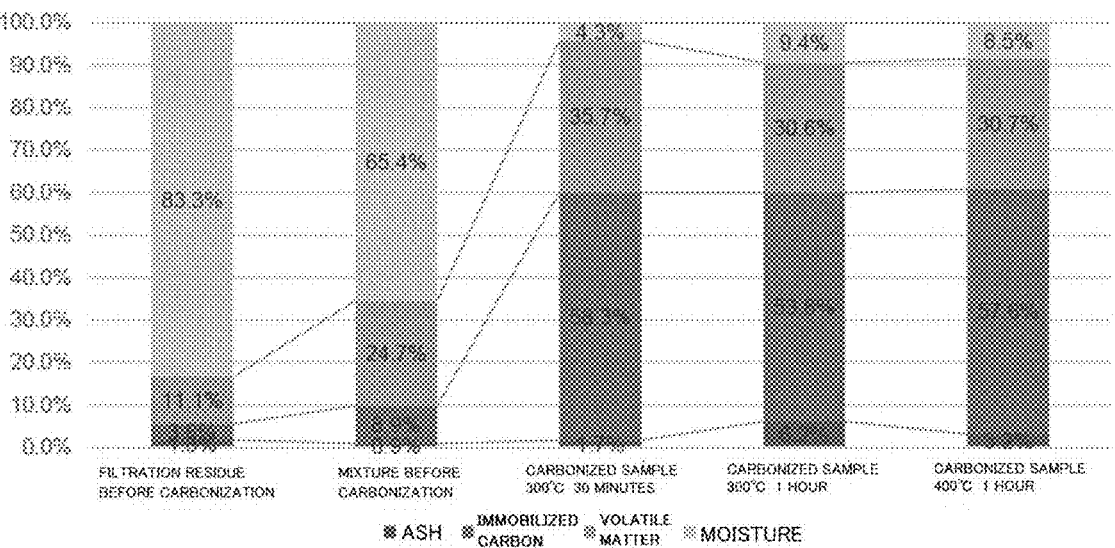
FIG. 13 is a view illustrating each component contained in a carbonized sample and a filtration residue and a mixture before carbonization on a water content basis.
Figure 14:
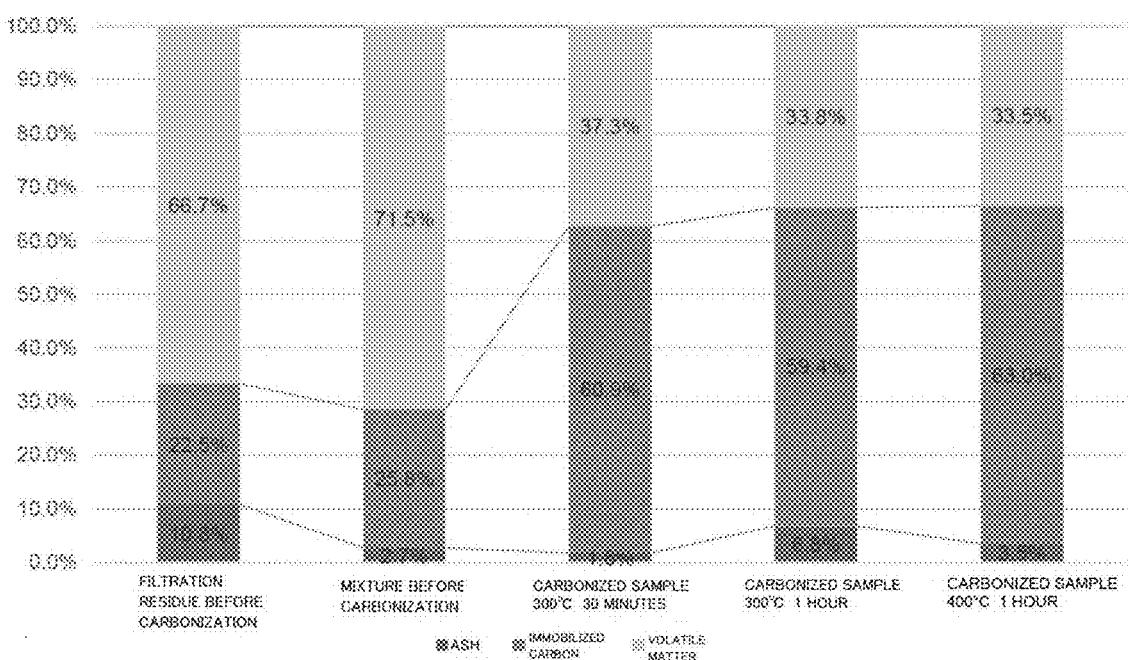
FIG. 14 is a view illustrating each component contained in a carbonized sample and a filtration residue and a mixture before carbonization on an anhydrous basis.

Each carbonized sample obtained in <Preparation of Carbonized Sample> described above was molded by a pelletizer so that a shape (diameter and length) and a bulk density were in accordance with the wood pellet quality standard specified by Japan Wood Pellet Association. The components contained in each of the carbonized samples and the filtration residue and the mixture before carbonization were measured in accordance with JIS M 8812:2004. Specifically, a loss component when the sample was heated at 107° C. for 1 hour was taken as moisture. Subsequently, a loss component when the sample was placed in a crucible with a lid and ignited at 900° C. for 1 hour was taken as volatile matter. Finally, a loss component when the sample was heated at 500 to 815° C. for 3 hours was taken as immobilized carbon, and the residue after heating was taken as ash. The results of the ratio of each contained component at this time are illustrated in FIG. 13. From FIG. 13, it was confirmed that the water contents of all of the carbonized samples were 10 wt % or less. In addition, the results of the ratio of each contained component on an anhydrous basis at this time are illustrated in FIG. 14. From FIG. 14, in all the carbonized samples, it was confirmed that the ratio of the immobilized carbon in the carbide was about 60 wt % on an anhydrous basis. Furthermore, a calorific value of the carbonized sample carbonized at a furnace temperature of 300° C. for 30 minutes was analyzed in accordance with JIS M 8814:2003. As a result, the sample had a heat quantity of 17.1 mega J/kg on an anhydrous basis.

INDUSTRIAL APPLICABILITY

The inventions according to Embodiments A and B can be used in the field of purifying water to be treated containing microplastics.

The carbonized combustion material of the invention according to Embodiment C can be used as fuel in domestic power generation, coal-fired power generation, and the like.

REFERENCE SIGNS LIST

10 Water treatment system
20 Aquaculture tank

30 Water treatment tank
32 Stirring mechanism
34 Gas sensor
36 Gas introduction pipe
38 Gas flow rate regulation pump
40 Introduction pipe
42 Flow rate control pump
44 First opening and closing valve
50 Discharge pipe
54 Second opening and closing valve
60 Algae reserve tank Description of Reference Signs in Embodiment B 10 Water treatment system
30 Water treatment tank
32 Stirring mechanism
34 Gas sensor
36 Gas introduction pipe
38 Gas flow rate regulation pump
40 Introduction pipe
42 Flow rate control pump
44 First opening and closing valve
46 Second opening and closing valve
50 Discharge pipe
60 Algae reserve tank

The invention claimed is:

1. A water treatment method for purifying water to be treated containing microplastics and nitrogen compounds, the water treatment method comprising
a step of allowing algae having a microplastic adsorption and recovery ability to be present in the water, recovering the microplastics from the water containing the microplastics and the nitrogen compounds, and removing the nitrogen compounds from the water,
a step of recovering the algae used for purification of the water from which the microplastics have been recovered and the nitrogen compounds have been removed; and
a step of replenishing new algae in the water.

2. The water treatment method according to claim 1, wherein the algae are algae that secrete a sticky substance.

3. The water treatment method according to claim 2, wherein the sticky substance is a polysaccharide.

4. The water treatment method according to claim 2, wherein the algae are at least one selected from diatoms, brown algae, dinoflagellates, chlorarachniophyte algae, green algae, red algae, conjugating green algae, euglena algae, and blue-green algae.

5. The water treatment method according to claim 2, wherein one or more selected from the group consisting of a heavy metal, a radioactive substance, a phosphorus compound, and a potassium compound are removed from the water to be treated.

6. The water treatment method according to claim 2, wherein one or more selected from the group consisting of astaxanthin, β-carotene, lutein, DHA, EPA, paramylon, wax ester, hydrogen, biodiesel, bioethanol, chlostanin, and squalene are produced.

7. The water treatment method according to claim 1, wherein the algae are at least one selected from diatoms, brown algae, dinoflagellates, chlorarachniophyte algae, green algae, red algae, conjugating green algae, euglena algae, and blue-green algae.

8. The water treatment method according to claim 1, wherein a timing of recovering the algae is set according to a growth degree of the algae.

9. The water treatment method according to claim 1, wherein one or more selected from the group consisting of a heavy metal, a radioactive substance, a phosphorus compound, and a potassium compound are removed from the water to be treated.

10. The water treatment method according to claim 1, wherein one or more selected from the group consisting of astaxanthin, β-carotene, lutein, DHA, EPA, paramylon, wax ester, hydrogen, biodiesel, bioethanol, chlostanin, and squalene are produced.

11. A water treatment system that purifies water to be treated containing microplastics and nitrogen compounds, wherein algae having a microplastic adsorption and recovery ability are present in the water so that the algae recover the microplastics from the water and the algae remove the nitrogen compounds from the water, and the water treatment system further includes means for recovering the algae used for purification of the water from the water from which the microplastics have been recovered and the nitrogen compounds have been removed; and means for replenishing new algae in the water from which the used algae have been recovered.

12. The water treatment system according to claim 11, wherein the algae are algae that secrete a sticky substance.

13. The water treatment system according to claim 12, wherein the sticky substance is a polysaccharide.

14. The water treatment system according to claim 11, wherein the algae are at least one selected from diatoms, brown algae, dinoflagellates, chlorarachniophyte algae, green algae, red algae, conjugating green algae, euglena algae, and blue-green algae.

15. The water treatment system according to claim 11, wherein a timing of recovering the algae is set according to a growth degree of the algae.

16. The water treatment system according to claim 11, wherein one or more selected from the group consisting of a heavy metal, a radioactive substance, a phosphorus compound, and a potassium compound are removed from the water to be treated.

17. The water treatment system according to claim 11, wherein one or more selected from the group consisting of astaxanthin, β-carotene, lutein, DHA, EPA, paramylon, wax ester, hydrogen, biodiesel, bioethanol, chlostanin, and squalene are produced.

* * * * *